United States Patent
Murphy et al.

(10) Patent No.: US 12,355,488 B2
(45) Date of Patent: Jul. 8, 2025

(54) OPTICAL AIRCRAFT NETWORK

(71) Applicant: The Boeing Company, Arlington, VA (US)

(72) Inventors: Timothy A. Murphy, Marysville, WA (US); Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 18/305,955

(22) Filed: Apr. 24, 2023

(65) Prior Publication Data
US 2024/0356639 A1    Oct. 24, 2024

(51) Int. Cl.
H04B 10/00    (2013.01)
H04B 10/112    (2013.01)
H04B 10/2575    (2013.01)

(52) U.S. Cl.
CPC ... H04B 10/1123 (2013.01); H04B 10/25759 (2013.01)

(58) Field of Classification Search
CPC .......... H04B 10/2575; H04B 10/25753; H04B 10/25759; H04B 10/071; H04B 10/807; H04B 10/808; H04B 10/516; H04B 10/548; H04B 10/0795; H04B 10/5161; H04B 10/5561; G02F 1/0121; G02F 1/0123
USPC ........ 398/183, 188, 115, 116, 117, 141, 158, 398/159, 16, 13, 17, 10, 33, 38, 185, 186, 398/187, 192, 193, 194, 195, 196, 197, 398/198, 135, 136, 25, 26, 27, 171; 385/1, 2, 3; 359/237, 238, 245, 247, 279
See application file for complete search history.

(56) References Cited

U.S. PATENT DOCUMENTS

| | | | | |
|---|---|---|---|---|
| 3,827,000 A | * | 7/1974 | Matsushita | G02F 1/0322 359/279 |
| 5,724,169 A | * | 3/1998 | LaGasse | H04B 10/25758 398/201 |
| 6,587,256 B2 | * | 7/2003 | Leight | G02F 1/0322 359/279 |
| 7,450,787 B2 | * | 11/2008 | Kucharski | H01S 5/0265 385/2 |

(Continued)

FOREIGN PATENT DOCUMENTS

CN    111585654 A    8/2020

OTHER PUBLICATIONS

European Patent Office Extended Search Report, dated Jul. 12, 2024, regarding Application No. EP 24155727.1, 11 pages.

*Primary Examiner* — Hanh Phan
(74) *Attorney, Agent, or Firm* — Yee & Associates, P.C.

(57) ABSTRACT

A signal transmission system comprises an optical fiber cable, an electrical-to-optical signal converter, and an optical signal receiver. The optical fiber cable extending through a vehicle. The electrical-to-optical signal converter is connected to a first end of the optical fiber cable and is connected an antenna. The optical signal converter, when operating, receives a radio frequency signal from the antenna; modulates an optical signal using the radio frequency signal to create a modulated optical signal; and transmits the modulated optical signal through the optical fiber cable from the first end. The optical signal receiver is connected to a second end of the optical fiber cable, wherein the optical signal receiver, when operating, converts the modulated optical signal into a data signal.

18 Claims, 18 Drawing Sheets

(56) References Cited

U.S. PATENT DOCUMENTS

| | | |
|---|---|---|
| 9,533,453 B2 | 1/2017 | Zuardy et al. |
| 2009/0074421 A1 | 3/2009 | Thaniyavarn |
| 2011/0278481 A1 | 11/2011 | Chan et al. |
| 2016/0204870 A1* | 7/2016 | Blauvelt ............... H01S 5/0014 398/183 |
| 2017/0257165 A1 | 9/2017 | Pescod et al. |
| 2018/0152239 A1* | 5/2018 | Von Der Weid ... H04B 10/0775 |
| 2022/0299675 A1 | 9/2022 | Soejima et al. |

\* cited by examiner

OPTICAL AIRCRAFT NETWORK

BACKGROUND INFORMATION

1. Field

The present disclosure relates generally to an improved aircraft communications system and in particular, to an optical aircraft network for communications within an aircraft.

2. Background

The weight of an aircraft is an important factor in designing aircraft such as commercial airplanes. For example, reducing the weight of a commercial airplane can provide benefits such as increased fuel efficiency. With increased fuel efficiency, environmental impacts with operating the commercial airplane can be reduced through the resulting lower fuel usage.

Various design considerations are present in the designing and manufacturing of aircraft. For example, aerodynamics is an important factor. Reducing drag can increase fuel efficiency.

As another example, the use of lighter weight structural materials used in an aircraft can have a significant impact on weight. For example, using composite materials for fuselage sections and skin panels instead of traditional metals can reduce the weight of the aircraft without sacrificing strength or performance that meets regulations and certification standards.

As another example, improved structural design can reduce the weight of the aircraft. For example, designing the fuselage and other structures to meet performance standards with less weight is desirable. Additionally, reducing the number of parts while maintaining the same functions in performance can also reduce the weight of an aircraft.

Designing and manufacturing aircraft in a manner that reduces the weight to obtain desired performance increases can be challenging. Therefore, it would be desirable to have a method and apparatus that takes into account at least some of the issues discussed above, as well as other possible issues.

SUMMARY

An embodiment of the present disclosure provides a signal transmission system comprising a first optical fiber cable extending through a vehicle; a second optical fiber cable extending through the vehicle; an optical source connected to a first end of the second optical fiber cable; electrical-to-optical signal converters connected in series; a phase adjuster; and an optical signal receiver. The optical source, when operating, transmits the optical signal through the second optical fiber cable. A first electrical-to-optical signal converter in the electrical-to-optical signal converters has an input connected to a second end of the second optical fiber and a last electrical-to-optical signal converter in the electrical-to-optical signal converters has an output connected to a first end of the first optical fiber cable and each electrical-to-optical signal converter in the electrical-to-optical signal converters has a signal input connected to an antenna. Each of the electrical-to-optical signal converters, when operating, receives a radio frequency signal at the signal input from the antenna; receives the optical signal; modulates the optical signal using the radio frequency signal; and outputs the optical signal with modulation. The phase adjuster, when operating, aligns a first phase of a portion of the optical signal received by each electrical-to-optical signal converter with a second phase of the radio frequency signal received by each electrical-to-optical signal converter after a first electrical-to-optical signal converter, such that each of the electrical-to-optical signal converters modulates the portion of the optical signal using a same segment of the radio frequency signal used to modulate the portion of the optical signal received by each electrical-to-optical signal converter. The optical signal receiver is connected to a second end of the first optical fiber cable. The optical signal receiver, when operating, converts the modulated optical signal into a data signal.

Another embodiment of the present disclosure provides a method for vehicle communications. An optical signal is sent through electrical-to-optical signal converters connected in series. A radio frequency signal is sent to each of the electrical-to-optical signal converters. A first phase of a portion of the optical signal sent to each of the electrical-to-optical signal converters is aligned with a second phase of the radio frequency signal sent to each of the electrical-to-optical signal converters after the first electrical-to-optical signal converter using a phase adjuster. Each of the electrical-to-optical signal converters modulates the optical signal using the radio frequency signal. Each of the electrical-to-optical signal converters modulates the portion of the optical signal using a same segment of the radio frequency signal used to modulate the portion of the optical signal received by each electrical-to-optical signal converter. The modulated optical signal is sent from a last output of the last electrical-to-optical signal converter through an optical fiber cable to an optical signal receiver connected to optical fiber cable, wherein the optical signal receiver converts the modulated optical signal into a data signal.

Yet another embodiment of the present disclosure provides a signal transmission system comprising an optical fiber cable, an electrical-to-optical signal converter, and an optical signal receiver. The optical fiber cable extends through a vehicle. The electrical-to-optical signal converter is connected to a first end of the optical fiber cable and is connected to an antenna. The optical signal converter, when operating, receives a radio frequency signal from the antenna; modulates an optical signal using the radio frequency signal to create a modulated optical signal; and transmits the modulated optical signal through the optical fiber cable from the first end. The optical signal receiver is connected to a second end of the optical fiber cable. The optical signal receiver, when operating, converts the modulated optical signal into a data signal.

Still another embodiment of the present disclosure provides a method for vehicle communications. An electrical-to-optical signal converter receives a radio frequency signal from an antenna connected to a vehicle. The electrical-to-optical signal converter modulates an optical signal using the radio frequency signal to create a modulated optical signal. The electrical-to-optical signal converter transmits the modulated optical signal through a first optical fiber cable from a first end. An optical signal receiver connected to a second end of the first optical fiber cable converts the modulated optical signal into a data signal.

Another embodiment of the present disclosure provides an optical sensor system comprising an optical fiber cable extending through a vehicle and an electrical-to-optical signal converter connected to a first end of the optical fiber cable and connected an antenna for the vehicle; an optical signal receiver connected to a second end of the optical fiber cable; an optical source connected to the second end of the optical fiber cable; a backscatter sensor connected to the second end of the optical fiber cable; and a signal analyzer in communication with the backscatter sensor. The optical signal converter, when operating, receives a radio frequency signal from the antenna; modulates an optical signal using the radio frequency signal to create a modulated optical signal; and transmits the modulated optical signal through the optical fiber cable from the first end. The optical signal receiver, when operating, converts the modulated optical signal into a data signal. The optical source, when operating, is controllable to transmit a set of optical fiber pulses through the optical fiber cable. The backscatter sensor, when operating, detects backscatter generated in response to the set of optical pulses and generates backscatter data in response to detecting the backscatter. The signal analyzer, when operating, determines parameters regarding the vehicle using the backscatter data.

Still another embodiment of the present disclosure provides a signal modulation system comprising electrical-to-optical signal converters in a set of phase adjusters. The set of phase adjusters is positioned in series in between signal inputs to the electrical-to-optical signal converters such that a first phase of an input signal is repeatedly matched with a second phase of an optical signal at each electrical-to-optical signal converter in the electrical-to-optical signal converters. A half wave voltage of the electrical-to-optical signal converters is reduced.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
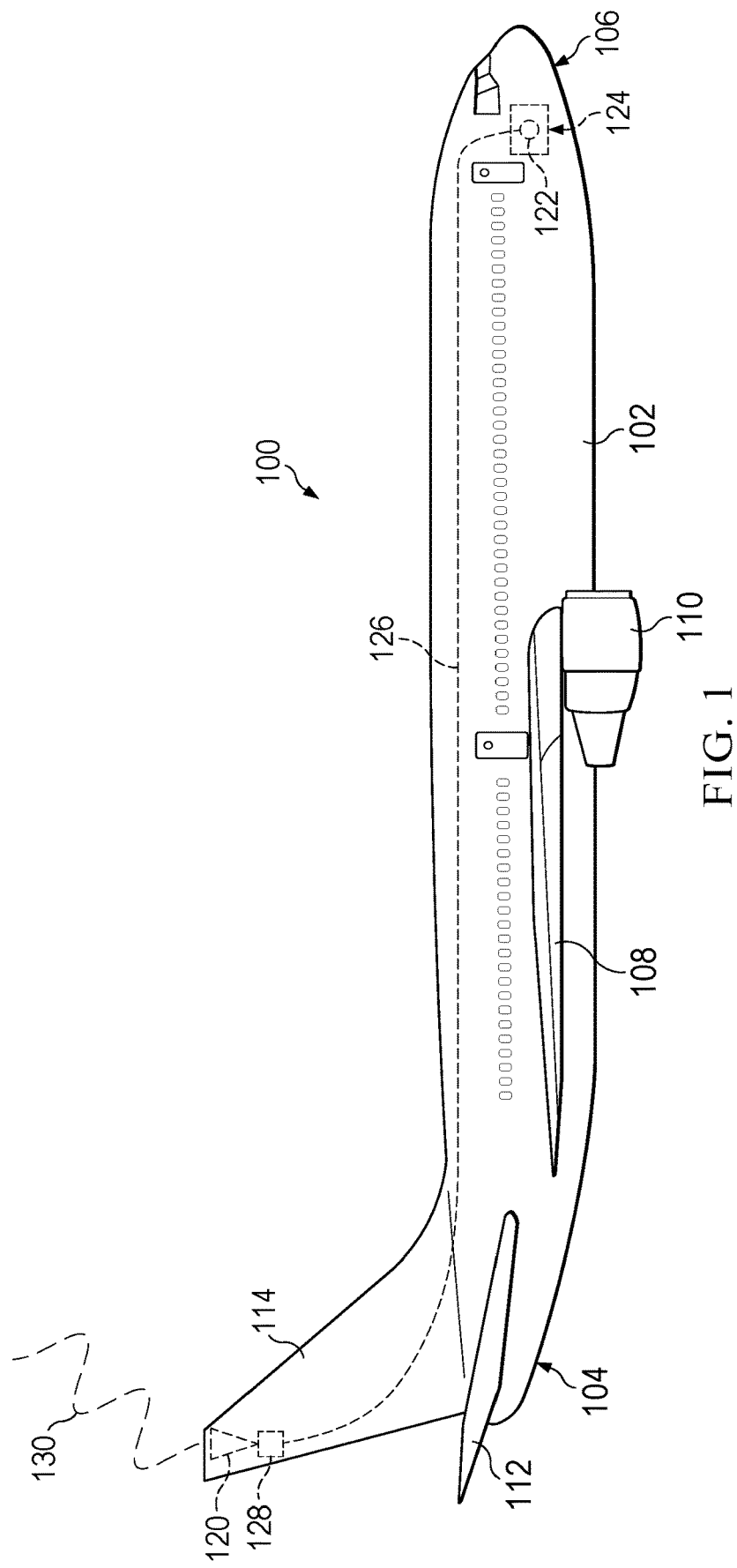
FIG. 1 is an illustration of a side view of an aircraft in accordance with an illustrative embodiment.

The illustrative embodiments recognize and take into account one or more different considerations as described herein. Components in an aircraft network can contribute to the weight of an aircraft. As more components are connected to the aircraft network, the weight increases. The communication links used in an aircraft network can contribute to the weight. For example, coaxial cables are used to transmit radio frequency signals from one location to another location in the aircraft. For example, a radio frequency signal can be detected in a radio frequency antenna in the vertical stabilizer of an aircraft. A coaxial cable can extend the length of the aircraft to an electronics and equipment (EE) bay located in the nose of aircraft. This coaxial cable, as well as the lengths of other cables within the aircraft, can result in the aircraft weighing more than desired. This cable weight can reduce the aircraft fuel efficiency. For example, a radio frequency antenna on the vertical stabilizer at the tail of the aircraft is currently connected to the electronics and equipment bay in the nose of the aircraft by a coaxial cable. This coaxial cable extends through the length of the fuselage from the tail to the nose.

Rather than using coaxial cables to transmit radio frequency signals through the aircraft, optical fiber cables can be used in place of these coaxial cables. This replacement of coaxial cables with optical fiber cables can result in weight reductions that increase the fuel efficiency of the aircraft. Further, using an optical fiber cable in place of the coaxial cable can also result in reducing or eliminating the need for disconnects and brackets typically used for grounding the coaxial cable.

In addition, replacing the coaxial cable with an optical fiber cable can result in increased performance with respect to receiving and transmitting radio frequency signals from the antenna on the vertical stabilizer. The use of optical fiber cables can result in less losses and transmitting the radio frequency signal in modulated optical signals.

Further, this increase in performance can result in an ability to use a smaller antenna on the vertical stabilizer. The smaller antenna can provide additional weight reduction as well as increased aerodynamic performance through the smaller size. For example, the smaller size for the antenna can result in a thinner vertical stabilizer as compared to using an antenna for receiving radio frequency signals that are transmitted through coaxial cable.

Thus, the illustrative examples provide a method, apparatus, and system for transmitting signals through a vehicle. In one illustrative example, radio frequency signals are received by an antenna in a vehicle such as aircraft. These radio frequency signals are converted to optical signals and sent through the aircraft to the receiver. The receiver converts the optical signals into data. This data can be the radio frequency signal or can be data decoded from the radio frequency signal. The data can be analog data or digital data. This data can carry information such as communications, flight plans, trajectories, commands, instructions, or other information.

In these illustrative examples, the radio frequency signals can be converted into optical signals by modulating the optical signals using the radio frequency signals. In other words, the information encoded in the radio frequency signals does not need to be extracted at this time. Instead, the radio frequency signals encoding the information is encoded into the optical signals for transmission through the aircraft.

With reference now to the figures, and in particular, with reference to FIG. 1, an illustration of a side view of an aircraft is depicted in accordance with an illustrative embodiment. As depicted in this view, aircraft 100 has fuselage 102 with tail section 104 and nose 106.

As depicted, wing 108 is connected to fuselage 102, and engine 110 is attached to wing 108. Aircraft 100 has another wing and engine not shown in this side view.

In this illustrative example, horizontal stabilizer 112, and vertical stabilizer 114 are shown as attached to tail section 104 of fuselage 102. Another horizontal stabilizer is present but not seen in this view.

In this depicted example, aircraft 100 has antenna 120 connected to vertical stabilizer 114. Antenna 120 is connected to electronics equipment 122 in electronics and equipment (EE) bay 124 in nose 106 of aircraft 100.

As depicted, the connection between antenna 120 and electronics equipment 122 is made using optical fiber system 126. When one component is "connected" to another component, the connection is a physical connection. For example, a first component, such as antenna 120, can be considered to be physically connected to a second component, such as electronics equipment 122, by at least one of being secured to the second component, bonded to the second component, mounted to the second component, welded to the second component, fastened to the second component, or connected to the second component in some other suitable manner. The first component also can be connected to the second component using a third component. In this example, the third component is optical fiber system 126. The first component can also be considered to be physically connected to the second component by being formed as part of the second component, an extension of the second component, or both.

Optical fiber system 126 extends through fuselage 102 of aircraft 100 from electronics and equipment bay 124 to antenna 120 on vertical stabilizer 114. Optical fiber system 126 comprises a set of optical fiber cables. As used herein, "a set of" when used with reference to items means one or more items. A set of optical fiber cables is one or more optical fiber cables.

As depicted, electrical-to-optical converter 128 connects optical fiber system 126 to antenna 120. In this example, optical fiber system 126 is connected to antenna 120 indirectly using electrical-to-optical converter 128.

As depicted, antenna 120 receives radio frequency signals 130. These radio frequency signals are converted to optical signals that are carried through optical fiber system 126 to electronics equipment 122 in electronics and equipment bay 124. In this example, the optical signals are modulated using radio frequency signals 130 received by antenna 120. The conversion of modulated optical signals to data can be performed by electronics equipment 122 in electronics and equipment bay 124.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Figure 2:
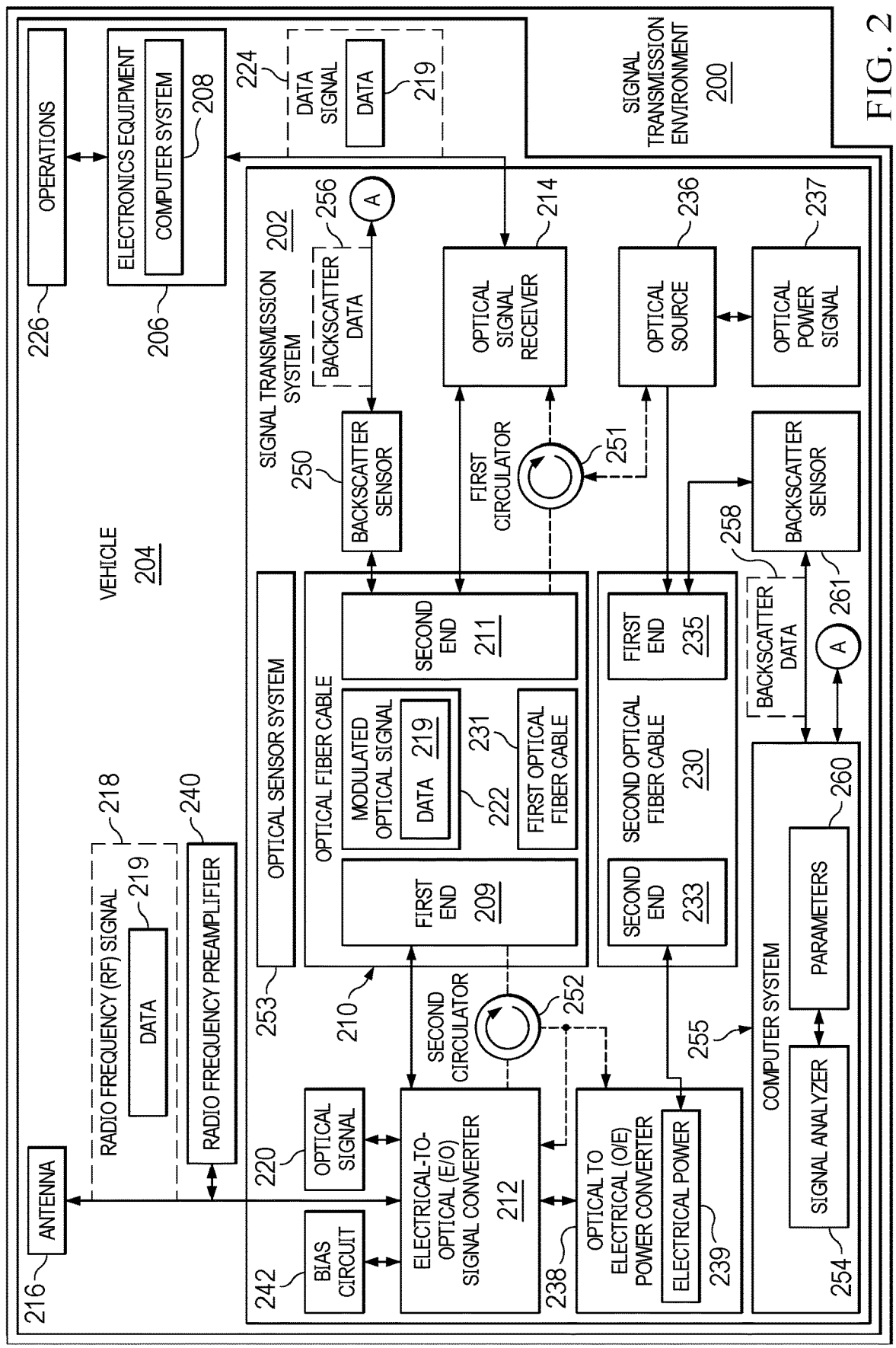
FIG. 2 is an illustration of a block diagram of a signal transmission environment in accordance with an illustrative embodiment.

With reference now to FIG. 2, an illustration of a block diagram of a signal transmission environment is depicted in accordance with an illustrative embodiment. In this illustrative example, signal transmission environment 200 includes components that can be implemented in hardware such as the hardware shown for aircraft 100 in FIG. 1.

As depicted in this illustrative example, signal transmission system 202 for vehicle 204 can receive radio frequency signals and transmit these signals within vehicle 204 for processing by electronics equipment 206 such as computer system 208.

In this illustrative example, signal transmission system 202 comprises a number of different components. As depicted, signal transmission system 202 comprises optical fiber cable 210, electrical-to-optical signal converter 212, and optical signal receiver 214. Optical fiber cable 210 extends through vehicle 204.

In this illustrative example, vehicle 204 can take a number of different forms. For example, vehicle 204 can be selected from a group comprising an aircraft, a commercial airplane, a surface ship, a submarine, a spacecraft, a train, a ground vehicle, and other suitable vehicles.

As depicted, electrical-to-optical signal converter 212 is connected to first end 209 of optical fiber cable 210. Electrical-to-optical signal converter 212 is also connected to antenna 216. Further, in this example, optical signal receiver 214 is connected to second end 211 of optical fiber cable 210.

In this example, antenna 216 is a passive antenna. In other words, antenna 216 is not a powered antenna. Antenna 216 can receive radio frequency signal 218. This radio frequency signal includes data 219 that can be used to operate vehicle 204. Data 219 can be at least one of communications, instructions, commands, parameters, or other types of data that can be used to operate vehicle 204.

During operation, electrical-to-optical signal converter 212 performs a number of different actions. For example, electrical-to-optical signal converter 212 receives radio frequency signal 218 from antenna 216 and modulates optical signal 220 using radio frequency signal 218 to create modulated optical signal 222. In this example, electrical-to-optical signal converter 212 can perform phase modulation, amplitude modulation, or some combination thereof on optical signal 220 to generate modulated optical signal 222.

In this illustrative example, optical signal 220 and modulated optical signal 222 are coherent light. The coherent light can be from various sources such as a laser, a light emitting diode, or other coherent light source.

In this illustrative example, the optical source generates coherent light for optical signal 220. Modulated optical signal 222 output from electrical-to-optical signal converter 212 remains as coherent light when phase modulation is used. With amplitude modulation, modulated optical signal 222 does not need to remain coherent when received by optical signal receiver 214.

In this example, electrical-to-optical signal converter 212 is a modulator. For example, electrical-to-optical signal converter 212 can be implemented using a Mach-Zehnder Modulator (MZM), electrical absorption modulator (EAM), a semiconductor optical amplifier (SOA), an intensity modulator, an electrical refraction modulator, or other type of electro-optic modulator that convert electrical signals, such as radio frequency signal 218, into optical signals. Further, in this example, modulated optical signal 222 encodes data 219 for transmission on optical fiber cable 210.

Electrical-to-optical signal converter 212 transmits modulated optical signal 222 through optical fiber cable 210 from first end 209. In response to receiving modulated optical signal 222, optical signal receiver 214 converts modulated optical signal 222 into data signal 224. Data signal 224 contains data 219 from radio frequency signal 218.

In this example, data signal 224 can take a number of different forms. For example, data signal 224 can be selected from at least one of analog data, digital data, radio frequency signal 218, or some other suitable form. As depicted, data signal 224 is sent through electronics equipment 206. In one example, electronics equipment 206 comprises computer system 208, which can use data signal 224 to perform operations 226 for vehicle 204. These operations can include at least one of changing a trajectory, a waypoint, an altitude, a speed, a velocity, or some other parameter with respect to operation of vehicle 204.

As depicted, signal transmission system 202 can include additional components. For example, signal transmission system 202 can also include second optical fiber cable 230 extending through vehicle 204. Second optical fiber cable 230 has first end 235 and second end 233. When second optical fiber cable 230 is present, optical fiber cable 210 is first optical fiber cable 231. In this example, second optical fiber cable 230 can be used to supply power to electrical-to-optical signal converter 212.

As depicted, optical source 236 is connected to first end 235 of second optical fiber cable 230. Optical to electrical power converter 238 is connected to second end 233 of second optical fiber cable 230 and is connected to electrical-to-optical signal converter 212. Optical source 236 is a source of optical signals. In this example, optical source 236 can take a number of different forms. For example, optical source 236 can be selected from at least one of a light emitting diode, a laser, or other sources of coherent light.

In this example, optical source 236 generates optical power signal 237 and transmits optical power signal 237 through second optical fiber cable 230. Optical to electrical power converter 238 generates electrical power 239 to supply power to electrical-to-optical signal converter 212 in response to receiving optical power signal 237 transmitted through second optical fiber cable 230. With this example, electrical-to-optical signal converter 212 generates optical signal 220 in response to receiving electrical power 239 from optical to electrical power converter 238.

In some illustrative examples, optical to electrical power converter 238 can be omitted. In this case, second end 233 of second optical fiber cable 230 is connected to electrical-to-optical signal converter 212. With this example, optical source 236 supplies optical signal 220. In other words, optical source 236 sends optical signal 220 through second optical fiber 232 to electrical-to-optical signal converter 212. As a result, electrical-to-optical signal converter 212 does not generate optical signal 220 but instead receives optical signal 220 and modulates optical signal 220 using radio frequency signal 218.

In one illustrative example, the reduction in the number of components in signal transmission system 202 can occur with the use of circulators. A circulator used for optical signals can be used to enable bidirectional transmission of optical signals through a single optical fiber cable. The circulator can be a three port device that allows an optical signal to propagate through this device in a single direction.

In one illustrative example, optical circulators such as first circulator 251 and second circulator 252 can be used in signal transmission system 202. With this example, first circulator 251 connects second end of optical fiber cable 210 to optical signal receiver 214. As depicted, optical source 236 is connected to first circulator 251.

Second circulator 252 connects first end 209 of optical fiber cable 210 to an output of the electrical-to-optical signal converter 212. In this example, optical to electrical power converter 238 is connected to second circulator 252 and is connected to electrical-to-optical signal converter 212.

In this example, second optical fiber cable 230 is not used. Thus, instead of transmitting optical power signal 237 through second optical fiber cable 230, optical source 236 transmits optical power signal 237 to first circulator 251. Optical power signal 237 transmitted to first circulator 251 by optical source 236 is routed by first circulator 251 through optical fiber cable 210 to second circulator 252. Second circulator 252 routes optical power signal 237 to an input of optical to electrical power converter 238. With this example, optical to electrical power converter 238 generates electrical power 239 and supplies this power to electrical-to-optical signal converter 212. Optical signal 220 is generated by electrical-to-optical signal converter 212 using electrical power 239.

In this example, modulated optical signal 222 is sent to second circulator 252 from electrical-to-optical signal converter 212 and is routed by second circulator 252 through optical fiber cable 210 to first circulator 251. First circulator 251 routes modulated optical signal 222 to optical signal receiver 214.

In another illustrative example, in which two circulators are used, optical to electrical power converter 238 can be omitted. With this example, first circulator 251 connects second end 211 of optical fiber cable 210 to optical signal receiver 214. Second circulator 252 connects first end 209 of optical fiber cable 210 to the output of electrical-to-optical signal converter 212 and is connected to input of the electrical-to-optical signal converter 212. Second circulator 252 is connected to electrical-to-optical signal converter 212 instead of optical to electrical power converter 238.

With this configuration, optical source 236 transmits optical signal 220 to electrical-to-optical signal converter 212. The transmission of optical signal 220 occurs with optical signal 220 being transmitted by optical source 236 to first circulator 251. First circulator 251 routes optical signal 220 through optical fiber cable 210 to second circulator 252. In this example, the output port of second circulator 252 that was connected to optical to electrical power converter 238 in the previous configuration is now connected to an input of electrical-to-optical signal converter 212. As a result, second circulator 252 routes optical signal 220 to electrical-to-optical signal converter 212.

In this example, electrical-to-optical signal converter 212 modulates optical signal 220 using radio frequency signal 218 to form modulated optical signal 222. Modulated optical signal 222 is sent to second circulator 252 from electrical-to-optical signal converter 212 and is routed by second circulator 252 through optical fiber cable 210 to first circulator 251. First circulator 251 routes modulated optical signal 222 to optical signal receiver 214.

In yet another illustrative example, radio frequency preamplifier 240 can be present in vehicle 204. With this example, radio frequency preamplifier 240 connects antenna 216 to electrical-to-optical signal converter 212. Radio frequency preamplifier 240 can amplify radio frequency signal 218 sent to electrical-to-optical signal converter 212 from antenna 216.

In yet another illustrative example, bias circuit 242 can be used with electrical-to-optical signal converter 212 to increase the sensitivity of electrical-to-optical signal converter 212 in response to changes in radio frequency signal 218. For example, bias circuit 242 can be used to set a bias point for electrical-to-optical signal converter 212 that provides the maximum sensitivity to small changes in an input signal such as radio frequency signal 218. In this example, the bias point can be set as a direct current bias voltage or current is applied to electrical-to-optical signal converter 212 to keep this modulator within the linear operating range and maintain or maximize modulation efficiency. In this example, bias circuit 242 can also be used to compensate for temperature variations that can cause a transfer function in electrical-to-optical signal converter 212 to change.

When electrical-to-optical signal converter 212 is implemented using a Mach-Zehnder Modulator (MZM), bias circuit 242 measures the input and output power of the Mach-Zehnder Modulator, compares the measurements, and sets a voltage of one of the optical waveguide arms for Mach-Zehnder Modulator to achieve the bias point.

Figure 3:
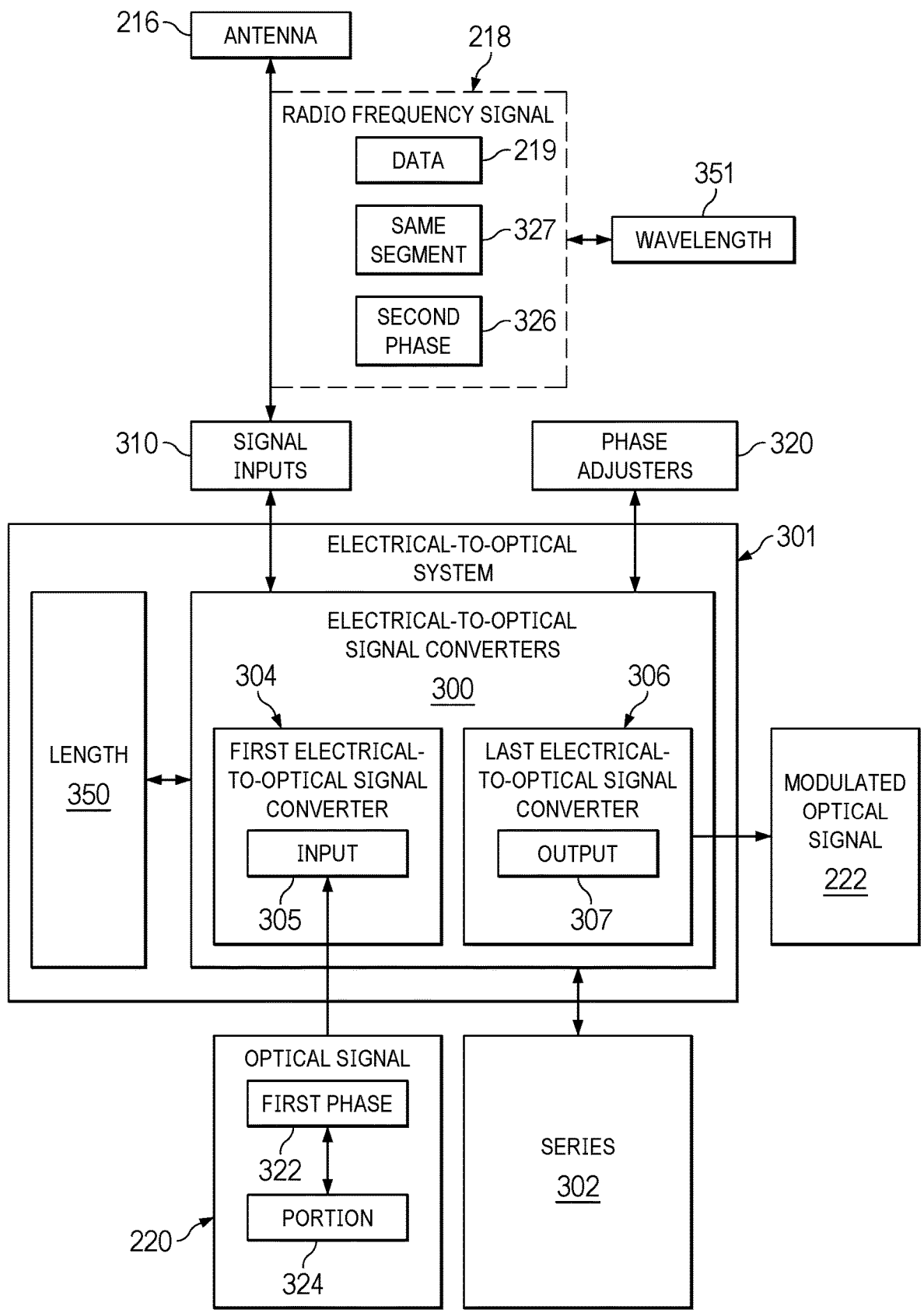
FIG. 3 is an illustration of block diagram of a series of electrical-to-optical signal converters in accordance with an illustrative embodiment.

Turning now to FIG. 3, an illustration of a block diagram of a series of electrical-to-optical signal converters is depicted in accordance with an illustrative embodiment. In the illustrative examples, the same reference numeral may be used in more than one figure. This reuse of a reference numeral in different figures represents the same element in the different figures.

In another illustrative example, a plurality of electrical-to-optical signal converters 300 can be used in place of electrical-to-optical signal converter 212 in FIG. 2. In this example, electrical-to-optical signal converters 300 are connected in series 302 to form electrical-to-optical system 301. With this example implementation, first electrical-to-optical signal converter 304 in electrical-to-optical signal converters 300 has input 305 connected to second end of second optical fiber cable 230 and last electrical-to-optical signal converter 306 in electrical-to-optical signal converters 300 has output 307 connected to first end 209 of first optical fiber cable 231.

As depicted, electrical-to-optical signal converters 300 have signal inputs 310 connected to antenna 216. With this example, each electrical-to-optical signal converter in the electrical-to-optical signal converters 300 has a signal input in signal inputs 310 connected to antenna 216.

As a result, each electrical-to-optical signal converter receives radio frequency signal 218 at a signal input in signal inputs 310 from antenna 216; receives optical signal 220; modulates optical signal 220 using radio frequency signal 218; and outputs optical signal 220 with modulation.

In this example, a set of phase adjusters 320 is used with electrical-to-optical signal converters 300. The set of phase adjusters 320 operates to align first phase 322 of portion 324 of optical signal 220 received by each electrical-to-optical signal converter with second phase 326 of radio frequency signal 218 received by each electrical-to-optical signal converter after first electrical-to-optical signal converter 304. This alignment is such that each of electrical-to-optical signal converters 300 modulates portion 324 of optical signal 220 using same segment 327 of radio frequency signal 218 used to modulate portion 324 of optical signal 220 received by each electrical-to-optical signal converter. In this example, same segment 327 refers to the same part or section of radio frequency signal 218.

In the illustrative example, the set of phase adjusters 320 can be selected from at least one of a radio frequency time delay device, a radio frequency time advance device, an optical time delay device, or an optical time advance device.

Modulating portion 324 in each of electrical-to-optical signal converters 300 with same segment 327 of radio frequency signal 218 can increase the ability to detect data 219. This type of modulation of portions of optical signal 220 with the corresponding same segments of radio frequency signal 218 can increase the signal-to-noise ratio (SNR) of radio frequency signal 218 used to modulate optical signal 220 to form modulated optical signal 222.

In this illustrative example, last electrical-to-optical signal converter 306 outputs modulated optical signal 222, which is input into first end 209 of optical fiber cable 210 for transmission to optical signal receiver 214 in FIG. 2.

In this illustrative example, length 350 of electrical-to-optical signal converters 300 in electrical-to-optical system 301 is selected to be less than or equal to wavelength 351 of radio frequency signal 218. In this illustrative example, the length of an electrical-to-optical converter in electrical-to-optical signal converters 300 is the length in the direction of travel of optical signal 220.

The illustration of signal transmission environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, signal transmission system 202 can also operate as optical sensor system 253 when additional components are present in signal transmission system 202. In one illustrative example, signal transmission system 202 can both transmit signals and operate as a sensor with the addition of at least one of backscatter sensor 250 or backscatter sensor 261. Another component can include computer system 255 and signal analyzer 254. In this example, computer system 255 is located within vehicle 204, and signal analyzer 254 is located in computer system 255.

In this illustrative example, backscatter sensor 250 and backscatter sensor 261 are sensors that detect and measure backscatter that is scattered back in the direction of optical source 236 in response to optical source 236 transmitting optical power signal 237 or optical signal 220 through an optical fiber cable.

Signal analyzer 254 can be implemented in software, hardware, firmware, or a combination thereof. When software is used, the operations performed by signal analyzer 254 can be implemented in program instructions configured to run on hardware, such as a processor unit. When firmware is used, the operations performed by signal analyzer 254 can be implemented in program instructions and data and stored in persistent memory to run on a processor unit. When hardware is employed, the hardware may include circuits that operate to perform the operations in signal analyzer 254.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this example, computer system 255 is a physical hardware system and includes one or more data processing systems. When more than one data processing system is present in computer system 255, those data processing systems are in communication with each other using a communications medium. The communications medium may be a network. The data processing systems may be selected from at least one of a computer, a server computer, a tablet, or some other suitable data processing system. Computer system 255 includes a number of processor units that are capable of executing program instructions implementing processes in the illustrative examples. In other words, program instructions are computer readable program instructions.

As depicted, backscatter sensor 250 is connected to second end 211 of first optical fiber cable 231. Backscatter sensor 261 is connected to first end 235 of second optical fiber cable 230. Both backscatter sensor 250 and backscatter sensor 261 are in communication with signal analyzer 254 in computer system 255.

In this illustrative example, backscatter sensor 250 and backscatter sensor 261 detect backscatter. During operation, optical source 236 transmits optical signals through at least one of first optical fiber cable 231 or second optical fiber cable 230. These optical signals can be, for example, optical power signal 237, optical signal 220, or other types of optical signals that optical source 236 can transmit through these optical fiber cables.

Backscatter is generated in response to the transmission of these optical signals by optical source 236 through at least one of first optical fiber cable 231 or second optical fiber cable 230. Backscatter sensor 250 generates backscatter data 256 and backscatter sensor 261 generate backscatter data 258 in response to detecting the backscatter. These sensors transmit backscatter data 256 and backscatter data 258 to signal analyzer 254.

Signal analyzer 254 can analyze this backscatter data to determine a set of parameters 260 regarding vehicle 204 using backscatter data 256 and backscatter data 258. The set of parameters can take a number different forms. For example, the set of parameters can be selected from at least one of temperature, a location of a detection of parameter, a vibration, a stress, a strain, a break in an optical fiber, or other parameters.

Figure 4:
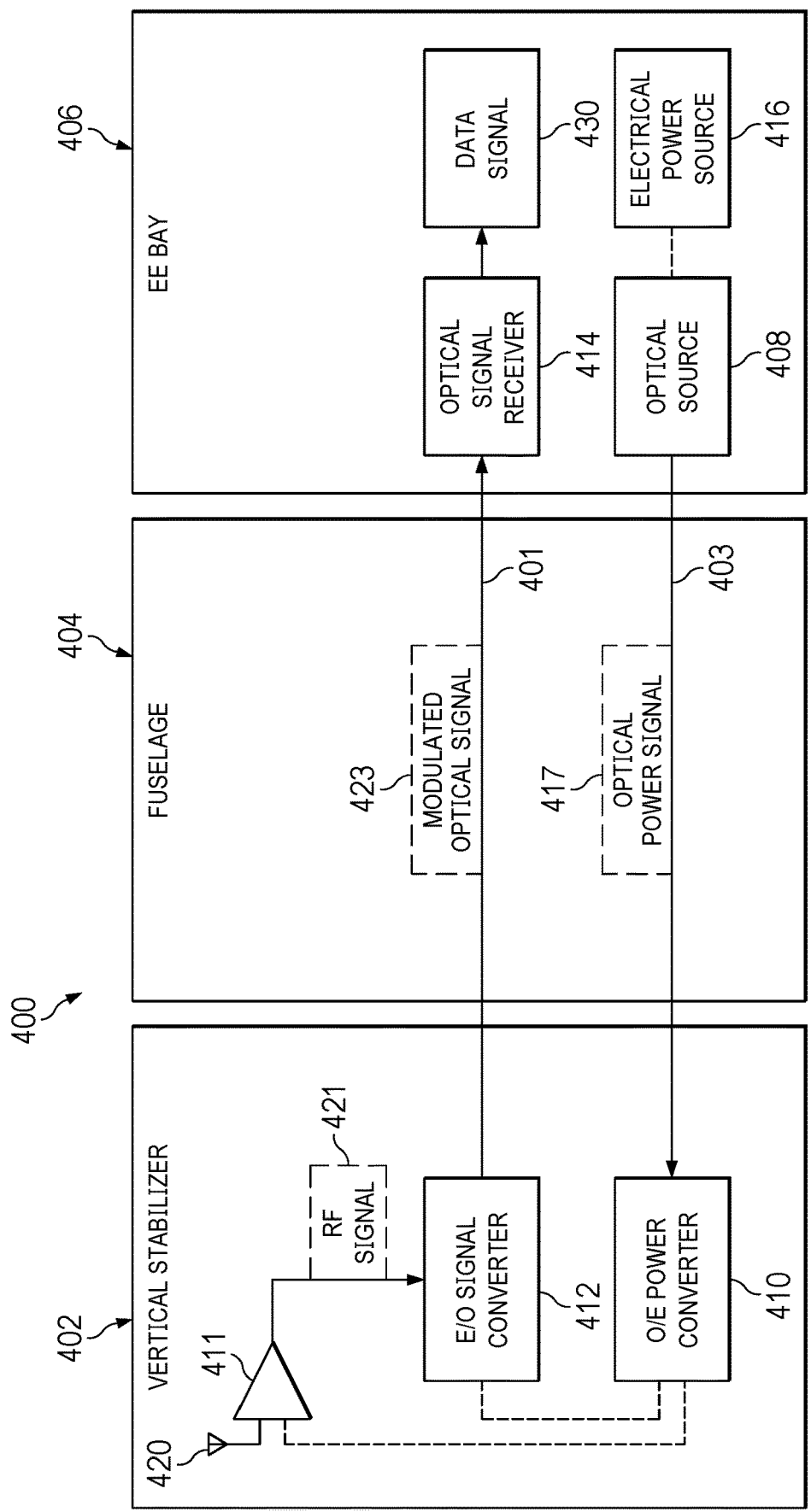
FIG. 4 is an illustration of a signal transmission system in accordance with an illustrative embodiment.

Turning next to FIG. 4, an illustration of a signal transmission system is depicted in accordance with an illustrative embodiment. As depicted, signal transmission system 400 is an example of an implementation for signal transmission system 202 in FIG. 2. This configuration can be used with antenna systems that generate radio frequency signals that are not amplified or processed by antenna 420. For example, a radio frequency signal generated by the antenna may have low power or a low signal-to-noise ratio. In this illustrative example, signal transmission system 400 is located in the different components of an aircraft. In this example, signal transmission system 400 is located in vertical stabilizer 402, fuselage 404, and electronics and equipment (EE) bay 406.

As depicted, signal transmission system 400 comprises first optical fiber cable 401 and second optical fiber cable 403. These optical fiber cables extend from vertical stabilizer 402 to electronics and equipment bay 406 through fuselage 404. Signal transmission system 400 also comprises optical source 408, optical to electrical (O/E) power converter 410, electrical-to-optical (E/O) signal converter 412, and optical signal receiver 414.

In this depicted example, electrical-to-optical signal converter 412 and optical to electrical power converter 410 are located in vertical stabilizer 402. Optical source 408 and optical signal receiver 414 are located in electronics and equipment bay 406 in this example.

As depicted, electrical-to-optical signal converter 412 is connected to optical signal receiver 414 by first optical fiber cable 401. Optical source 408 is connected to optical to electrical power converter 410 by second optical fiber cable 403.

In this illustrative example, electrical-to-optical signal converter 412 and optical to electrical power converter 410 are located in vertical stabilizer 402.

In this example, antenna 420 is attached to or located in vertical stabilizer 402. Antenna 420 is connected to electrical-to-optical signal converter 412 by radio frequency preamplifier 411.

In this illustrative example, optical source 408 is powered by electrical power source 416. Optical source 408 generates optical power signal 417. Optical power signal 417 is sent through second optical fiber cable 403 to optical to electrical power converter 410. In response to receiving optical power signal 417, optical to electrical power converter 410 generates electrical power. In this example, the electrical power is supplied to electrical-to-optical signal converter 412 and radio frequency preamplifier 411.

In this example, radio frequency preamplifier 411 can operate as a low noise amplifier. In this example, radio frequency (RF) signal 421 detected by antenna 420 is amplified by radio frequency preamplifier 411 and sent to electrical-to-optical signal converter 412. Electrical-to-optical signal converter 412 generates an optical signal and modulates the optical signal using a radio frequency signal to generate modulated optical signal 423. In this example, electrical-to-optical signal converter 412 performs direct modulation. In other words, electrical-to-optical signal converter 412 generates the optical signal and modulates the optical signal.

Electrical-to-optical signal converter 412 sends modulated optical signal 423 through first optical fiber cable 401 to optical signal receiver 414. In this example, optical signal receiver 414 converts modulated optical signal 423 into an electrical signal. Additionally, optical signal receiver 414 outputs data signal 430. Data signal 430 can be in the form of radio frequency signal 421, analog data decoded from radio frequency signal 421, digital data decoded from radio frequency signal 421, or some other form of data.

Figure 5:
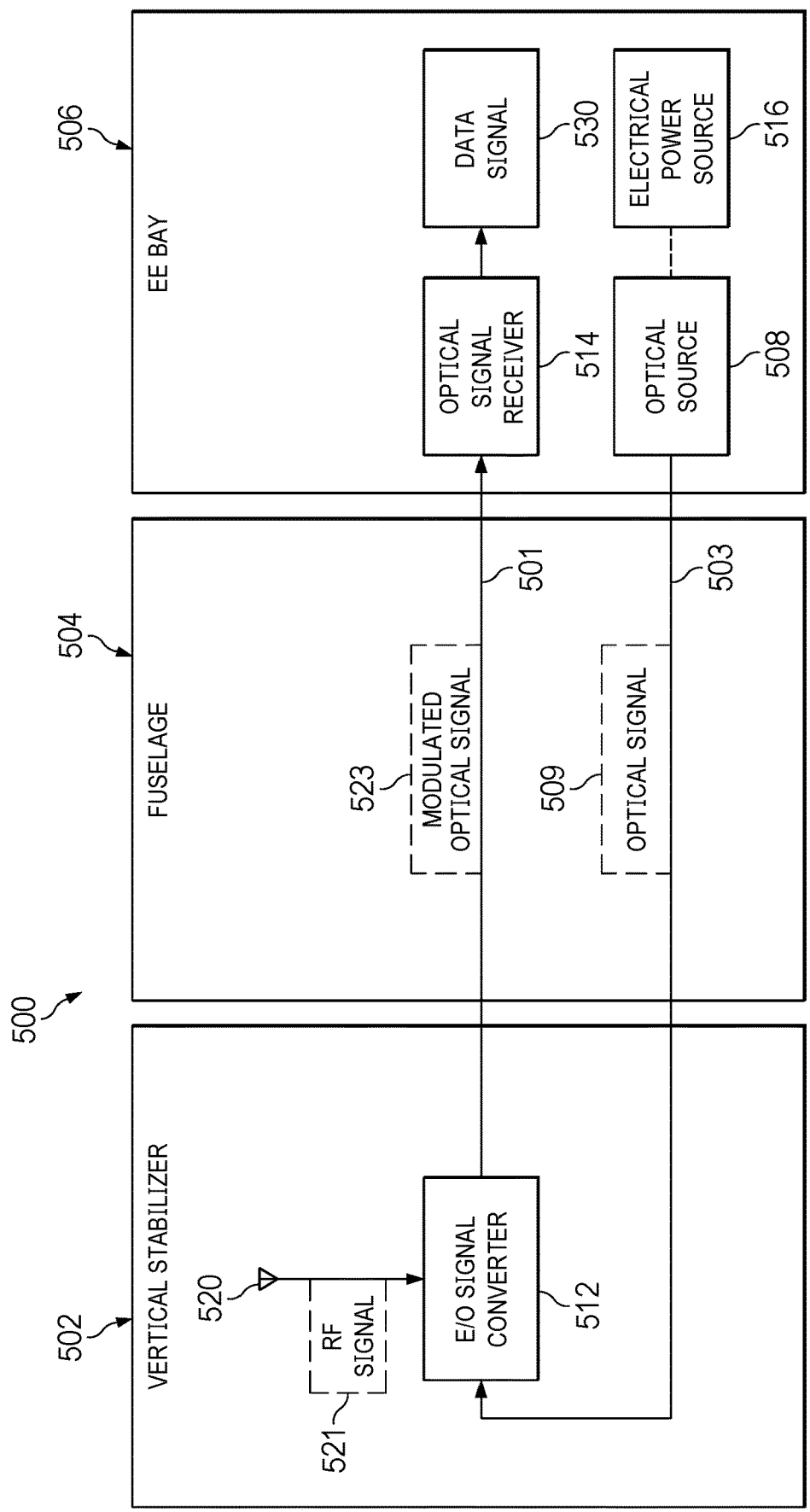
FIG. 5 is an illustration of a signal transmission system in accordance with an illustrative embodiment.

With reference next to FIG. 5, an illustration of a signal transmission system is depicted in accordance with an illustrative embodiment. As depicted, signal transmission system 500 is an example of an implementation for signal transmission system 202 in FIG. 2. In this illustrative example, signal transmission system 500 is located in the different components of an aircraft. In this example, signal transmission system 500 has components located in vertical stabilizer 502, fuselage 504, and electronics and equipment (EE) bay 506.

As depicted, signal transmission system 500 comprises first optical fiber cable 401 and second optical fiber cable 503. These optical fiber cables extend from vertical stabilizer 502 to electronics and equipment bay 506 through fuselage 504. Signal transmission system 500 also comprises optical source 508, electrical-to-optical (E/O) signal converter 512, and optical signal receiver 514.

As depicted, electrical-to-optical signal converter 512 is connected to optical signal receiver 514 by first optical fiber cable 501. Optical source 508 is connected to electrical-to-optical signal converter 512 by second optical fiber cable 403.

In this illustrative example, electrical-to-optical signal converter 512 is located in vertical stabilizer 502. Optical source 508 and optical signal receiver 514 are located in electronics and equipment bay 406 in this example.

In this example, antenna 520 is attached to or located in vertical stabilizer 502. As depicted, antenna 520 is directly connected to electrical-to-optical signal converter 512.

In this illustrative example, optical source 508 is powered by electrical power source 516. Optical source 408 sends optical signal 509 to electrical-to-optical signal converter 512 through second optical fiber cable 503. In this case, electrical-to-optical signal converter 512 does not generate the optical signal for modulation.

Electrical-to-optical signal converter 512 also receives radio frequency (RF) signal 521 from antenna 520. Electrical-to-optical signal converter 512 modulates optical signal 509 using radio frequency signal 521. In this example, this modulation results in modulated optical signal 523. In this example, electrical-to-optical signal converter 512 is considered to perform external modulation. Electrical-to-optical signal converter 512 sends modulated optical signal 523 to optical signal receiver 514 through first optical fiber cable 501.

Further, in this example, optical signal receiver 514 converts modulated optical signal 523 into an electrical signal. Additionally, optical signal receiver 414 outputs data signal 530. Data signal 530 can be an electrical signal in the form of radio frequency signal 521, analog data decoded from radio frequency signal 521, digital data decoded from radio frequency signal 521, or some other form of data.

Figure 6:
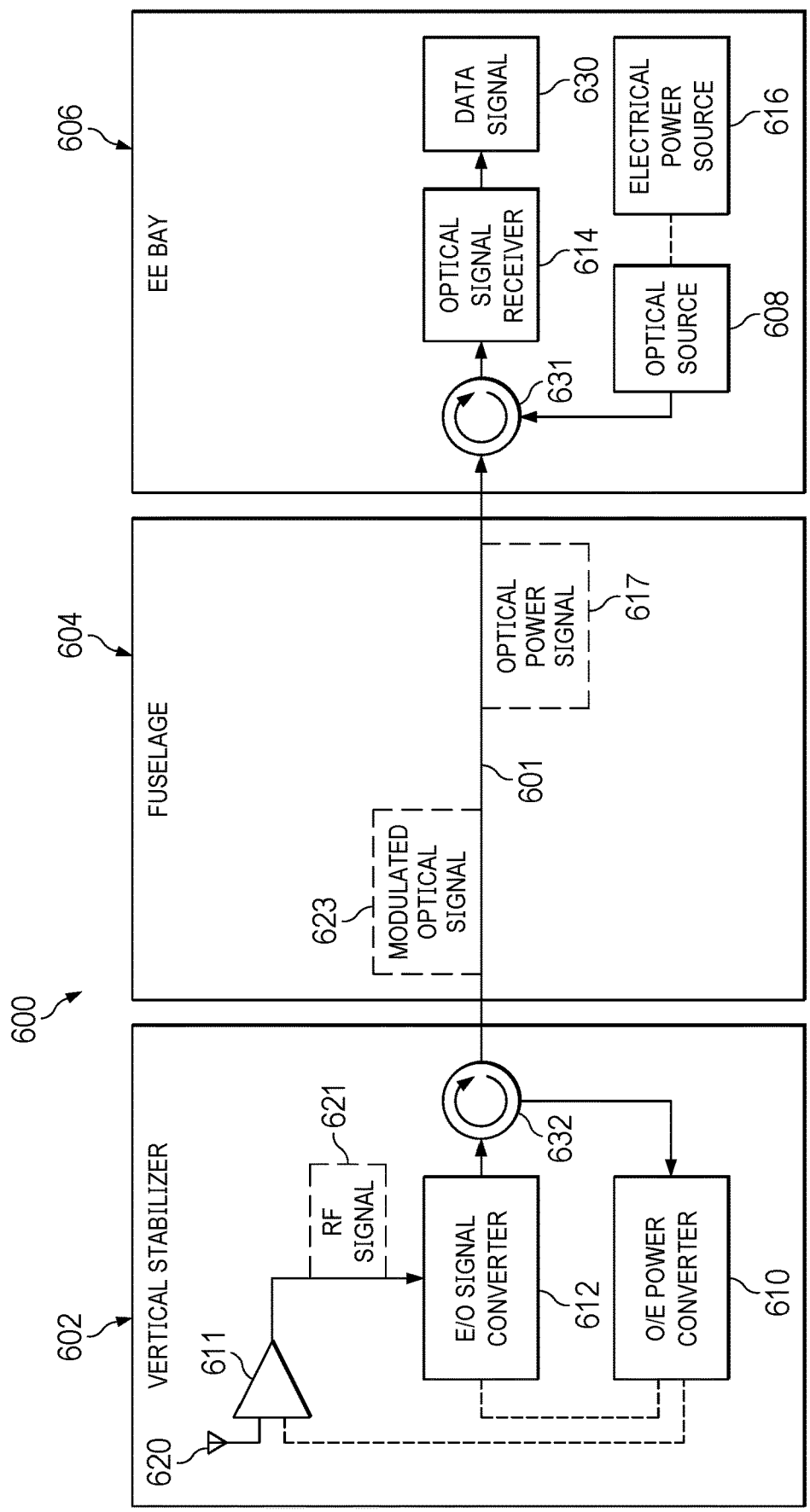
FIG. 6 is another illustration of a signal transmission system in accordance with an illustrative embodiment.

With reference next to FIG. 6, another illustration of a signal transmission system is depicted in accordance with an illustrative embodiment. As depicted, signal transmission system 600 is an example of an implementation for signal transmission system 202 in FIG. 2. In this illustrative example, signal transmission system 600 is located in the different components of an aircraft. In this example, signal transmission system 600 has components located in vertical stabilizer 602, fuselage 604, and electronics and equipment (EE) bay 606.

As depicted, signal transmission system 600 comprises optical fiber cable 601. This optical fiber cable extends from vertical stabilizer 602 to electronics and equipment bay 606 through fuselage 604. Signal transmission system 600 also comprises optical source 608, optical to electrical (O/E) power converter 610, electrical-to-optical (E/O) signal converter 612, and optical signal receiver 614. Signal transmission system 600 also includes first circulator 631 and second circulator 532. These components can be used to provide bidirectional transmission of optical signals through optical fiber cable 601. As a result, a second optical fiber cable does not need to be used.

In this illustrative example, electrical-to-optical signal converter 612, optical to electrical power converter 610, and second circulator 632 are located in vertical stabilizer 602. Optical source 608, optical signal receiver 614, and first circulator 631 are located in electronics and equipment bay 606 in this example.

As depicted, antenna 620 is located in or can be attached to vertical stabilizer 602. Antenna 620 is connected to electrical-to-optical signal converter 612 by radio frequency preamplifier 611.

As depicted, optical signal receiver 614 is connected to optical fiber cable 601 by first circulator 631. In this example, optical source 608 is connected to optical fiber cable 601 by first circulator 631.

In this example, electrical-to-optical signal converter 612 is connected to optical fiber cable 601 by second circulator 632. Optical to electrical power converter 610 is connected to second circulator 632.

In this illustrative example, optical source 608 receives power from electrical power source 616 and generates optical power signal 617. Optical source 608 sends optical power signal 617 into first circulator 631. First circulator 631 routes optical power signal 617 through optical fiber cable 601. Second circulator 632 receives optical power signal 617 and routes this signal to optical to electrical power converter 610. Optical to electrical power converter 610 uses optical power signal 617 to generate electrical power. This electrical power is supplied to electrical-to-optical signal converter 612 and to radio frequency preamplifier 611.

Electrical-to-optical signal converter 612 generates an optical signal using the power received from optical to electrical power converter 610. Electrical-to-optical signal converter 612 receives radio frequency (RF) signal 621 from radio frequency preamplifier 611. In response to receiving radio frequency signal 621, electrical-to-optical signal converter 612 modulates the optical signal using radio frequency signal 621 to generate modulated optical signal 623. In this example, electrical-to-optical signal converter 612 sends modulated optical signal 623 to second circulator 632. This circulator routes modulated optical signal 623 through optical fiber cable 601 to first circulator 631. In turn, first circulator 631 routes modulated optical signal 623 to optical signal receiver 614.

In this example, optical signal receiver 614 converts modulated optical signal 623 into an electrical signal and outputs data signal 630. Data signal 630 can be an electrical signal in the form of radio frequency signal 621, analog data decoded, digital data, or some other form of data.

Figure 7:
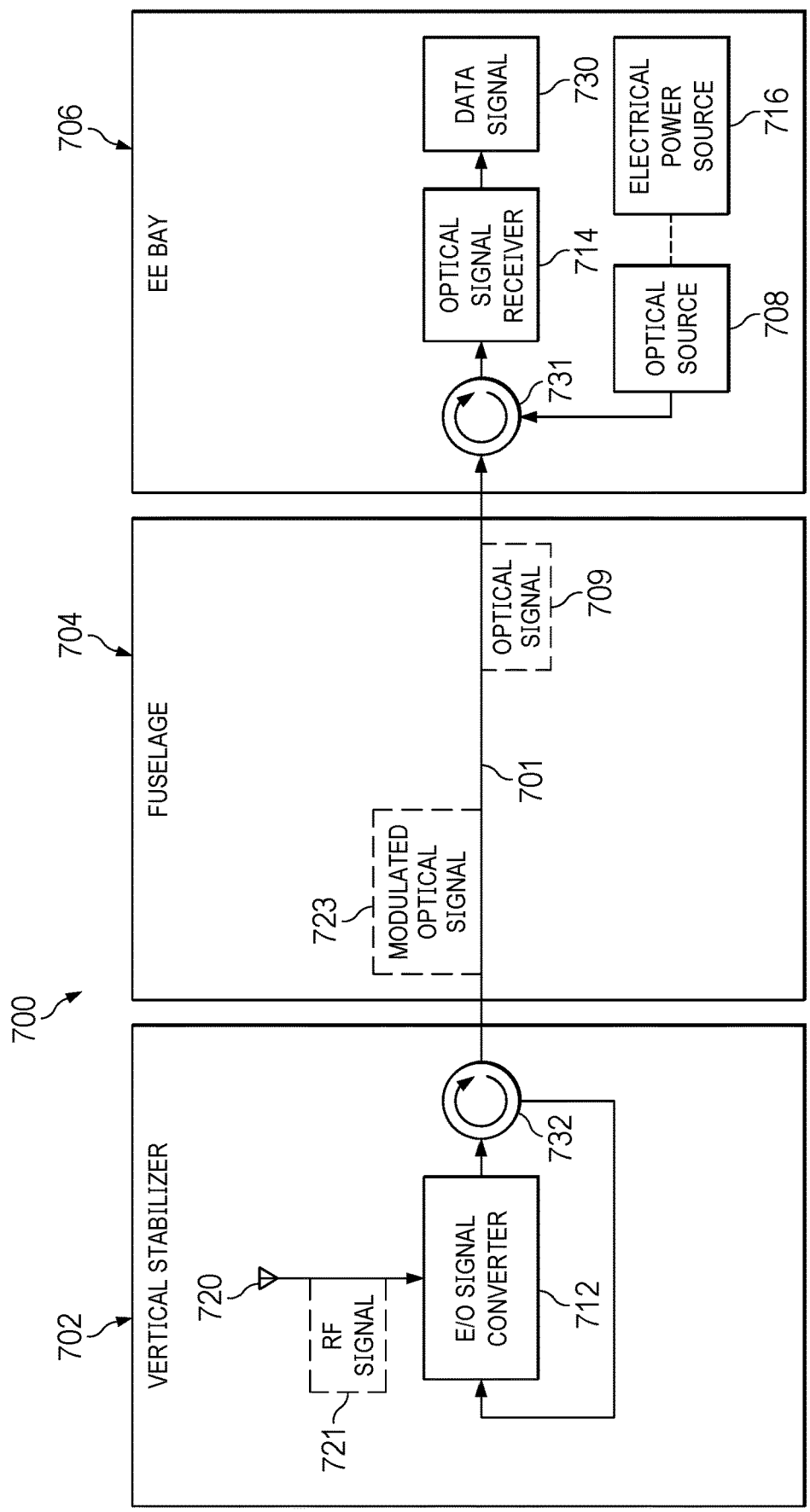
FIG. 7 is yet another illustration of a signal transmission system in accordance with an illustrative embodiment.

Turning now to FIG. 7, yet another illustration of a signal transmission system is depicted in accordance with an illustrative embodiment. As depicted, signal transmission system 700 is an example of an implementation for signal transmission system 202 in FIG. 2. In this illustrative example, signal transmission system 700 is located in the different components of an aircraft. In this example, signal transmission system 700 has components located in vertical stabilizer 702, fuselage 704, and electronics and equipment (EE) bay 706.

As depicted, signal transmission system 700 comprises optical fiber cable 701. This optical fiber cable extends from vertical stabilizer 702 to electronics and equipment bay 706 through fuselage 704. Signal transmission system 700 also comprises optical source 708, electrical-to-optical (E/O) signal converter 712, and optical signal receiver 714. Signal transmission system 700 also includes first circulator 731 and second circulator 732. These components can be used to provide bidirectional transmission of optical signals through optical fiber cable 701. As a result, a second optical fiber cable does not need to be used.

As depicted, electrical-to-optical signal converter 712, and second circulator 732 are located in vertical stabilizer 702. Optical source 708, optical signal receiver 714, and first circulator 731 are located in electronics and equipment bay 706 in this example.

As depicted, antenna 720 is located in or can be attached to vertical stabilizer 702. Antenna 720 is directly connected to electrical-to-optical signal converter 612.

As depicted, optical signal receiver 714 is connected to optical fiber cable 701 by first circulator 731. In this example, optical source 708 is connected to optical fiber cable 701 by first circulator 731.

In this example, electrical-to-optical signal converter 712 is connected to optical fiber cable 701 by second circulator 732. Optical to electrical power converter 710 is connected to second circulator 732.

In this illustrative example, optical source 708 receives power from electrical power source 716 and generates optical signal 709. Optical source 708 sends optical signal 709 into first circulator 731, which routes optical signal 709 through optical fiber cable 701. Second circulator 732 receives optical signal 709 and routes this optical signal to electrical-to-optical signal converter 712.

Electrical-to-optical signal converter 712 receives radio frequency (RF) signal 721 from antenna 720. Electrical-to-optical signal converter 712 modulates the optical signal 709 using radio frequency signal 721 to generate modulated optical signal 723. In this example, electrical-to-optical signal converter 712 sends modulated optical signal 723 to second circulator 732. This circulator routes modulated optical signal 723 to first circulator 731 through optical fiber cable 701. In turn, first circulator 731 routes modulated optical signal 723 to optical signal receiver 714.

In this example, optical signal receiver 714 converts modulated optical signal 723 into an electrical signal and outputs data signal 730. Data signal 730 can be an electrical signal in the form of radio frequency signal 721, analog data, digital data, or some other form of data.

Figure 8:
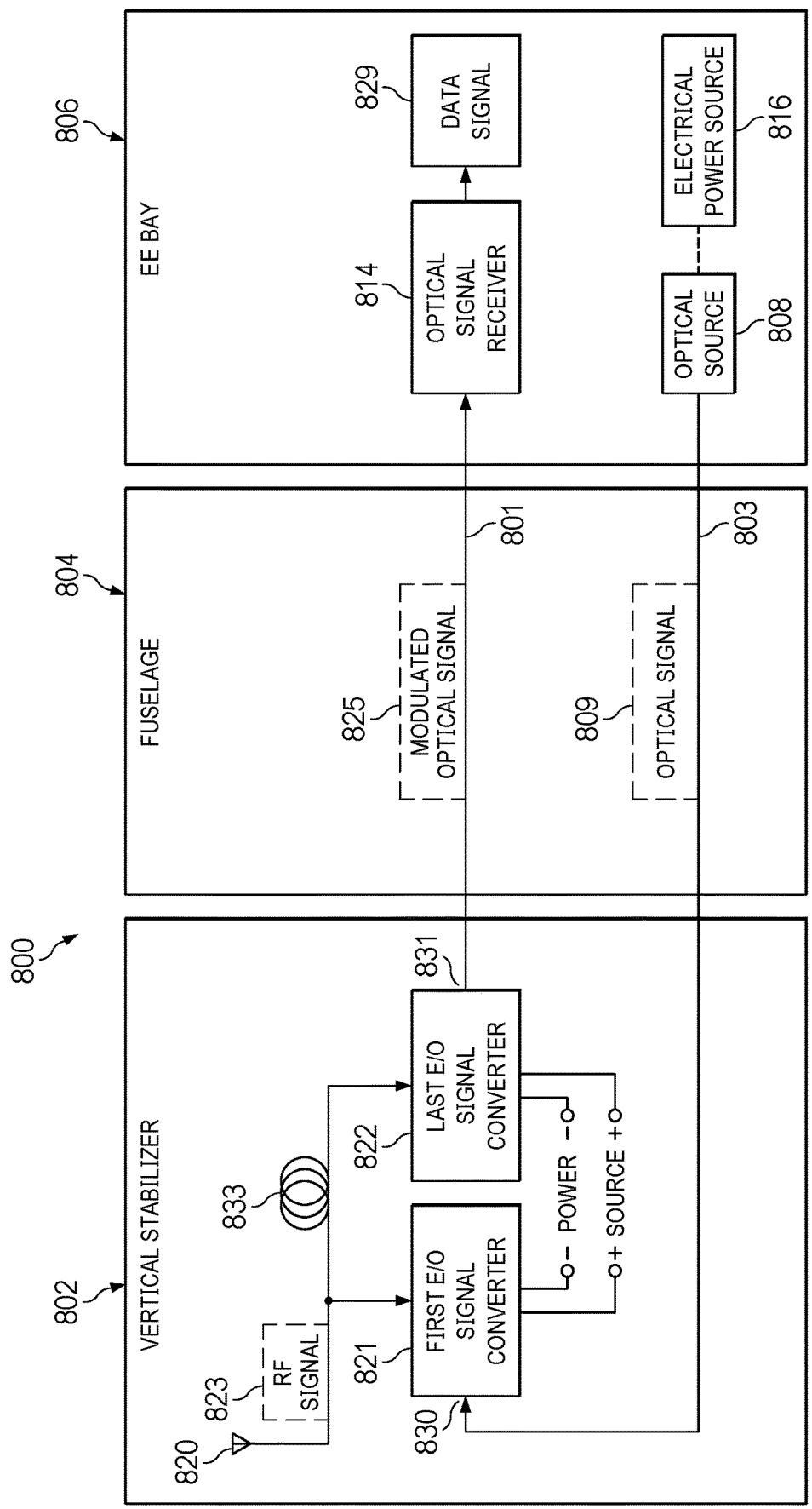
FIG. 8 is another illustration of a signal transmission system in accordance with an illustrative embodiment.

Next, in FIG. 8, another illustration of a signal transmission system is depicted in accordance with an illustrative embodiment. As depicted, signal transmission system 800 is an example of an implementation for signal transmission system 202 in FIG. 2. As depicted in this illustrative example, signal transmission system 800 is located in the different components of an aircraft. In this example, signal transmission system 800 has components located in vertical stabilizer 802, fuselage 804, and electronics and equipment (EE) bay 806.

In this illustrative example, signal transmission system 800 comprises first optical fiber cable 801 and second optical fiber cable 803. These two optical fiber cables extend from vertical stabilizer 802 through fuselage 804 to electronics and equipment bay 806. Signal transmission system 800 also comprises optical source 808, first electrical-to-optical (E/O) signal converter 821, last electrical-to-optical (E/O) signal converter 822, and optical signal receiver 814.

As depicted, first electrical-to-optical signal converter 821 and last electrical-to-optical signal converter 822 are connected in series. In this example, input 830 of first electrical-to-optical signal converter 821 is connected to second optical fiber cable 803. Output 331 of last electrical-to-optical signal converter 822 is connected to first optical fiber cable 801, which in turn is connected to optical signal receiver 814 by first optical fiber cable 801. Optical source 808 is connected to second optical fiber cable 803.

In this illustrative example, first electrical-to-optical signal converter 821 and last electrical-to-optical signal converter 822 are located in vertical stabilizer 502. Optical source 508 and optical signal receiver 814 are located in electronics and equipment bay 806 in this depicted example.

In this example, antenna 820 is attached to or located in vertical stabilizer 802. As depicted in this example, antenna 520 is directly connected to first electrical-to-optical signal converter 821. Antenna 520 is connected to last electrical-to-optical signal converter 822 by adjuster 833.

In this example, adjuster 833 can be implemented as a time delay and is comprised of a length of coaxial cable. This coaxial cable can be coiled in some illustrative examples. This time delay is an example of an implementation for a phase adjuster in the set of phase adjusters 320 in FIG. 3. In another example, a different waveguide can be used to speed up the radio frequency signal to have adjuster 833 operate as a time advance device.

Adjuster 833 can be selected to align the phase of the portion of optical signal 809 received by each of the electrical-to-optical signal converters. This alignment results in each of the electrical-to-optical signal converters modulating the same portion of optical signal 809 generated by optical source 808 with the same segment of radio frequency signal 823.

In this example, last electrical-to-optical signal converter 822 modulates a portion of optical signal 809 using a same segment of radio frequency (RF) signal 823 used by first electrical-to-optical signal converter 821 to modulate the same portion of optical signal 809.

In other words, the same segment of radio frequency signal 823 is used by both first electrical-to-optical signal converter 821 and last electrical-to-optical signal converter 822 to modulate the same portion of optical signal 809. As a result, increase in a signal-to-noise ratio can be achieved by repeatedly modulating the same portion of optical signal 809 with the same segment of radio frequency signal 823. In this example, the ability to modulate the same portion of optical signal 809 with the same segment of radio frequency signal 823 can occur through selecting adjuster 833 to implement an advance or a delay such that the phases of the optical signal and the radio frequency signal are aligned.

During operation, optical source 808 receives power from electrical power source 816 and generates optical signal 809. Optical source 808 sends optical signal 809 to input 830 of first electrical-to-optical signal converter 821 through second optical fiber cable 803. With first electrical-to-optical signal converter 821 and last electrical-to-optical signal converter 822 connected in series, optical signal 809 passes through both of these components. Both of these electrical-to-optical signal converters also receive radio frequency signal 823.

In this example, first electrical-to-optical signal converter 821 modulates optical signal 809 using radio frequency signal 823. Last electrical-to-optical signal converter 822 also modulates the modulated optical signal received from first electrical-to-optical signal converter 821 to form modulated optical signal 825. As described above, adjuster 833 is selected such that both first electrical-to-optical signal converter 821 and last electrical-to-optical signal converter 822 modulate the same portion of optical signal 809 with the same segment of radio frequency signal 823.

Modulated optical signal 825 is output from output 831 of last electrical-to-optical signal converter 822 and transmitted through first optical fiber cable 801 to optical signal receiver 814. Optical signal receiver 814 converts modulated optical signal 825 into data signal 829.

Figure 9:
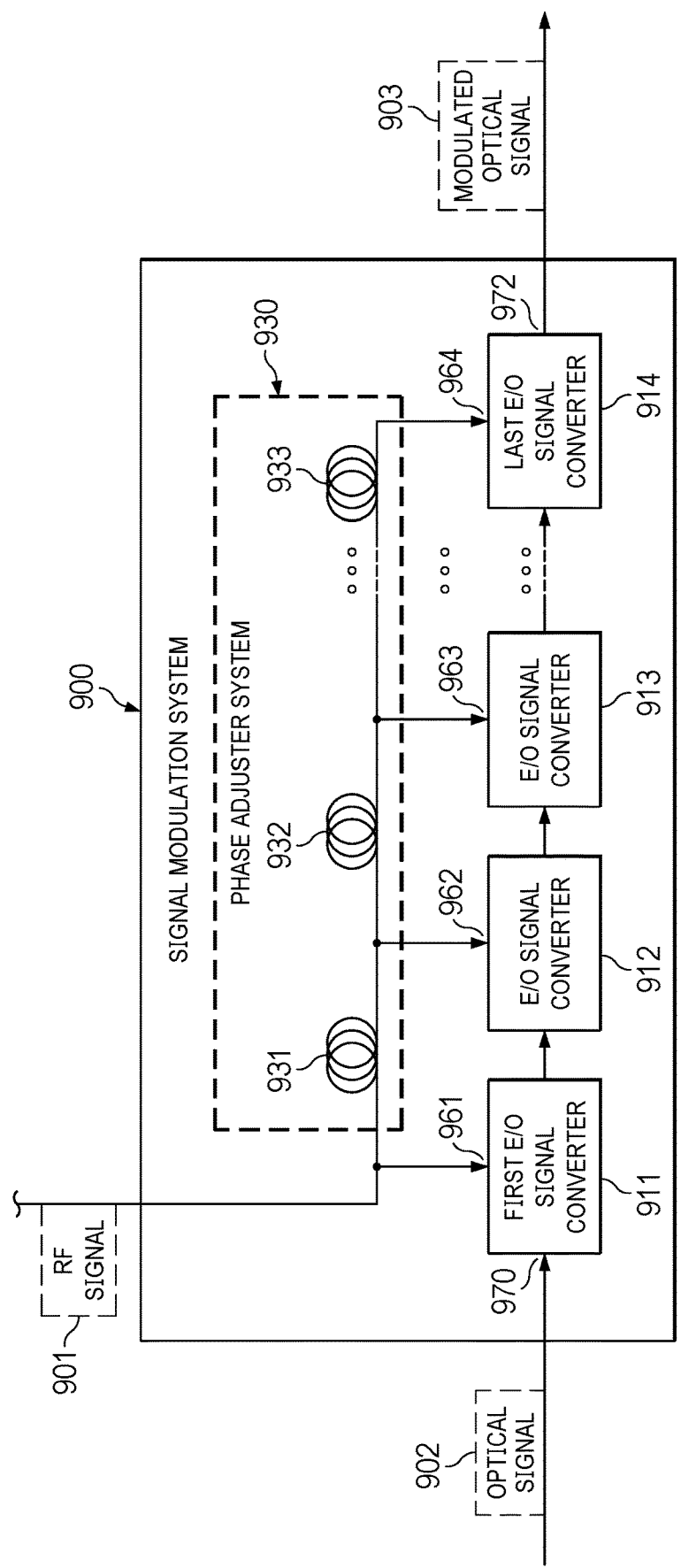
FIG. 9 is an illustration of an electrical-to-optical converter system in accordance with an illustrative embodiment.

With reference now to FIG. 9, an illustration of an electrical-to-optical converter system is depicted in accordance with an illustrative embodiment. In this illustrative example, signal modulation system 900 is an example of one implementation for electrical-to-optical system 301 in FIG. 3. In this illustrative example, signal modulation system 900 can receive radio frequency signal 901 and optical signal 902. Signal modulation system 900 modulates optical signal 902 using radio frequency (RF) signal 901 and outputs this modulated signal as modulated optical signal 903.

In this illustrative example, modulated optical signal 903 can be processed to have an increased signal-to-noise ratio through using a series of electrical-to-optical signal converters that can modulate the same portion of optical signal 902 with the same segment of radio frequency signal 901.

As depicted in this example, signal modulation system 900 comprises first electrical-to-optical signal converter 911, electrical-to-optical signal converter 912, electrical-to-optical signal converter 913, and last electrical-to-optical signal converter 914.

As depicted, these devices have signal inputs. For example, first electrical-to-optical signal converter 911 has signal input 961, electrical-to-optical signal converter 912 has signal input 962, electrical-to-optical signal converter 913 has signal input 963, and last electrical-to-optical signal converter 914 has signal input 964. The signal inputs receive radio frequency signal 901 that is used to modulate optical signal 902 that is received at input 970 of first electrical-to-optical signal converter 911. This optical signal passes through the electrical-to-optical signal converters and is modulated by each of the electrical-to-optical signal converters using radio frequency signal 901 input to the signal inputs. Optical signal 902 is output as modulated optical signal 903 at output 972 of last electrical-to-optical signal converter 914 after being modulated by the different electrical-to-optical signal converters.

Further, in this example, phase adjuster system 930 comprises adjusters in the form of time delay devices. These time delay devices are used with each of the electrical-to-optical signal converters except for first electrical-to-optical signal converter 911.

As depicted, phase adjuster system 930 comprises phase adjuster 931, phase adjuster 932, and phase adjuster 933. These phase adjusters are connected in series between the inputs to the electrical-to-optical signal converters. In another example, the phase adjusters can be connected between the electrical-to-optical signal converters if they are to be used to adjust the phase of optical signal 902.

In this illustrative example, these phase adjusters provide a time delay or time advancement at the inputs of the electrical-to-optical signal converters to align the phase of radio frequency signal 901 with the phase of optical signal 902. Further, in this example, phase adjuster 931 provides a phase adjustment for radio frequency signal 901 sent to electrical-to-optical signal converter 912; phase adjuster 932 provides the phase adjustment for radio frequency signal 901 sent to electrical-to-optical signal converter 913; and phase adjuster 933 provides the phase adjustment for radio frequency signal 901 sent to last electrical-to-optical signal converter 914. This phase adjustment aligns the phase of radio frequency signal 901 with the phase of optical signal 902. This alignment is such that each of the electrical-to-optical signal converters modulates the same portion of optical signal 902 with the same segment of radio frequency signal 901. This type of modulation enables increasing the signal-to-noise ratio of radio frequency signal 901 encoded in modulated optical signal 903.

With this configuration of electrical-to-optical signal converters in signal modulation system 900, a phase of two signals is repeatedly matched at each electrical-to-optical signal converter in the electrical-to-optical signal converters. This matching of the phase can result in a reduction in a half wave of the electro-optic modulator in addition to enabling modulating the same portion of optical signal 902 with the same segment of radio frequency signals 901 at each of the electrical-to-optical signal converters.

In this example, the length of the electrical-to-optical signal converters is selected to be less than the wavelength of the input signal, radio frequency signal 901. The length of these electrical-to-optical signal converters is the length in the direction of travel for optical signal 902 though these devices.

In this illustrative example, signal modulation system 900 is depicted as modulating a radio frequency signal. In other illustrative examples, other types of signals can be modulated. These signals input into signal modulation system 900 for modulation can be, for example, an analog data signal, an optical signal, or other suitable type of signal.

Figure 10:
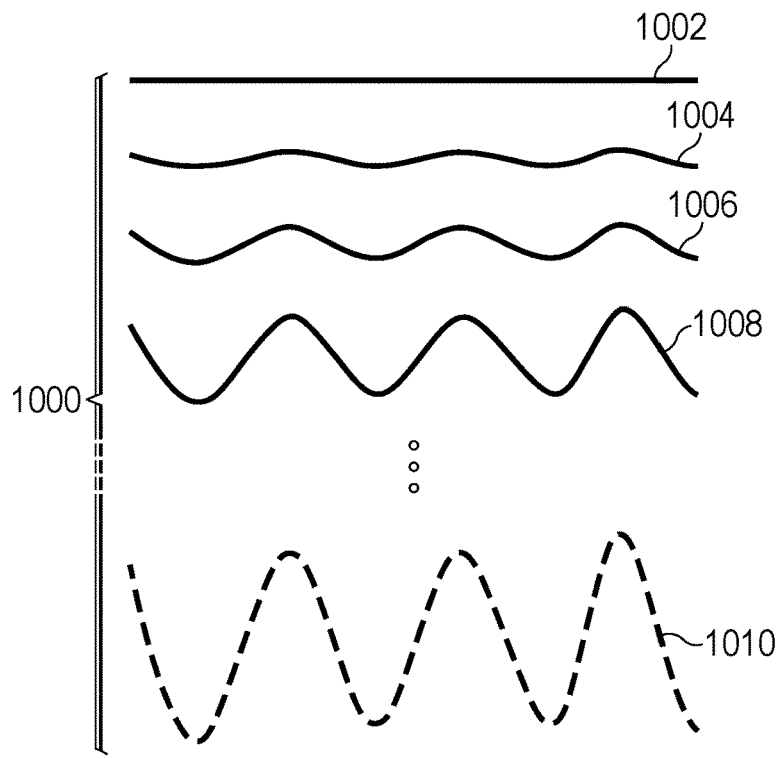
FIG. 10 is an illustration of optical signal modulation in accordance with an illustrative embodiment.

With reference next to FIG. 10, an illustration of optical signal modulation is depicted in accordance with an illustrative embodiment. In this illustrative example, optical signals 1000 are examples of optical signal 902 in FIG. 9 during different stages of modulation.

As depicted, optical signal 1002 is an example of optical signal 902 prior to being sent into input 970 of first electrical-to-optical signal converter 911. As depicted, optical signal 1004 is the optical signal output by first electrical-to-optical signal converter 911 after modulating optical signal 902 using radio frequency signal 901.

Optical signal 1006 is generated by electrical-to-optical signal converter 912 from modulating the optical signal received from first electrical-to-optical signal converter 911. Optical signal 1006 is modulated using radio frequency signal 901. In this example, the phase of the radio frequency signal and the optical signal are aligned such that electricalto-optical signal converter 912 modulates a portion of the optical signal received from first electrical-to-optical signal converter 911 using the same segment from the radio frequency signal as used by first electrical-to-optical signal converter 911.

Next, optical signal 1008 represents the optical signal as modulated by electrical-to-optical signal converter 913. As depicted, the alignment using phase adjustments results in electrical-to-optical signal converter 913 modulating the same portion of the optical signal as modulated by the prior electrical-to-optical signal converters using the same segment of the radio frequency signal as used by the prior electrical-to-optical signal converters.

Modulated optical signal 1010 is an example of modulated optical signal 903 in FIG. 9. This optical signal is output by last electrical-to-optical signal converter 914 after modulating the optical signal using the radio frequency signal. As with the other electrical-to-optical signal converters, the alignment of the optical signal with the radio frequency signal results in last electrical-to-optical signal converter 914 modulating the same portion of the optical signal as the prior electrical-to-optical signal converters using the same corresponding segment from the radio frequency signal.

As depicted in this example, the signal-to-noise ratio increases progressively after each modulation of the optical signal using the radio frequency signal. As a result, modulated optical signal 1010 may be more easily processed to obtain data. This type of modulation can be useful in cases where the antenna that generates radio frequency signal is a passive antenna and does not provide any application or prior processing of the radio frequency signal detected.

Figure 11:
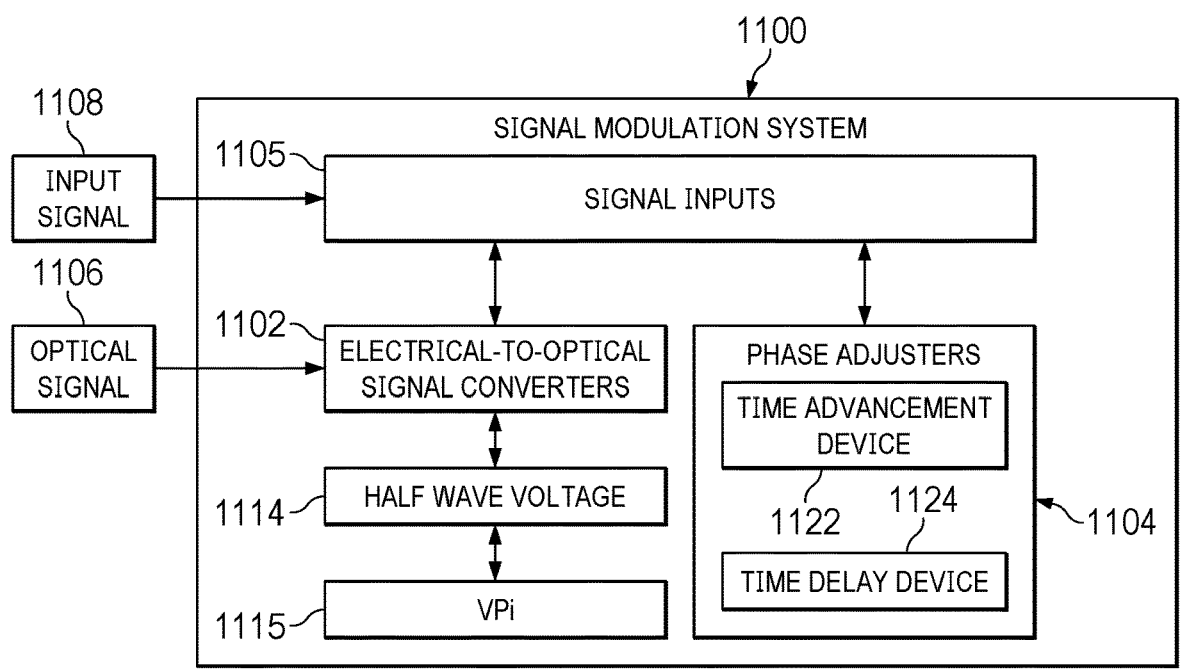
FIG. 11 is an illustration of a signal modulation system in accordance with an illustrative embodiment.

With reference now to FIG. 11, an illustration of a signal modulation system is depicted in accordance with an illustrative embodiment. In this illustrative example, signal modulation system 1100 comprises electrical-to-optical signal converters 1102 and a set of phase adjusters 1104. In this illustrative example, electrical-to-optical signal converters 1102 modulates optical signal 1106 using input signal 1108. Electrical-to-optical signal converters 1102 can take a number of different forms. For example, electrical-to-optical signal converters 1102 can be selected from at least one of a bulk electro-optic modulator, a traveling wave electro-optic modulator, or some other suitable type of electrical-to-optical signal converter that can modulate signals. In this example, input signal 1108 can be, for example, a radio frequency signal, an optical signal, an analog electrical signal, or some other suitable type of signal that is to be used to modulate optical signal 1106.

In this illustrative example, the set of phase adjusters 1104 is positioned in series in between signal inputs 1105 to electrical-to-optical signal converters 1102 such that first phase 1110 of input signal 1108 is repeatedly matched with second phase 1112 of optical signal 1106 at each electrical-to-optical signal converter in electrical-to-optical signal converters 1102. This matching can reduce half wave voltage 1114 of electrical-to-optical signal converters 1102. This halfway voltage is also referred to as Vpi 1115.

The set of phase adjusters 1104 can change the timing of input signal 1108 by delaying input signal 1108 or advancing input signal 1108. In these illustrative examples, the phase adjusters can be selected from at least one of time delay device 1124 or time advancement device 1122. In this illustrative example, time delay device 1124 can be a radio frequency time delay device, an optical time delay device, or other suitable type of time delay device. Time advancement device 1122 can be a radio frequency time advance device, an optical time advance device, or other suitable type of time advance device. The set of phase adjusters 1104 can be selected from at least one of a coaxial cable or an optical fiber cable. Depending on the type of material used, the phase adjustment can advance the phase by advancing the timing of the signal or delay the phase by delaying the timing of the signal.

In an illustrative example, a phase adjuster in the set of phase adjusters 1104 can be comprised of a high refractive index material. This high refractive index material can be a photonic crystal. In another example, the high refractive index material can be a nanostructured material. This nanostructured material can have a structure selected from one of an amorphous structure and a crystalline structure.

In another example, the set of phase adjusters 1104 can be comprised of a low refractive index material. The low refractive index material is selected from a group comprising an air gap, a photonic crystal, and a holey fiber.

Figure 12:
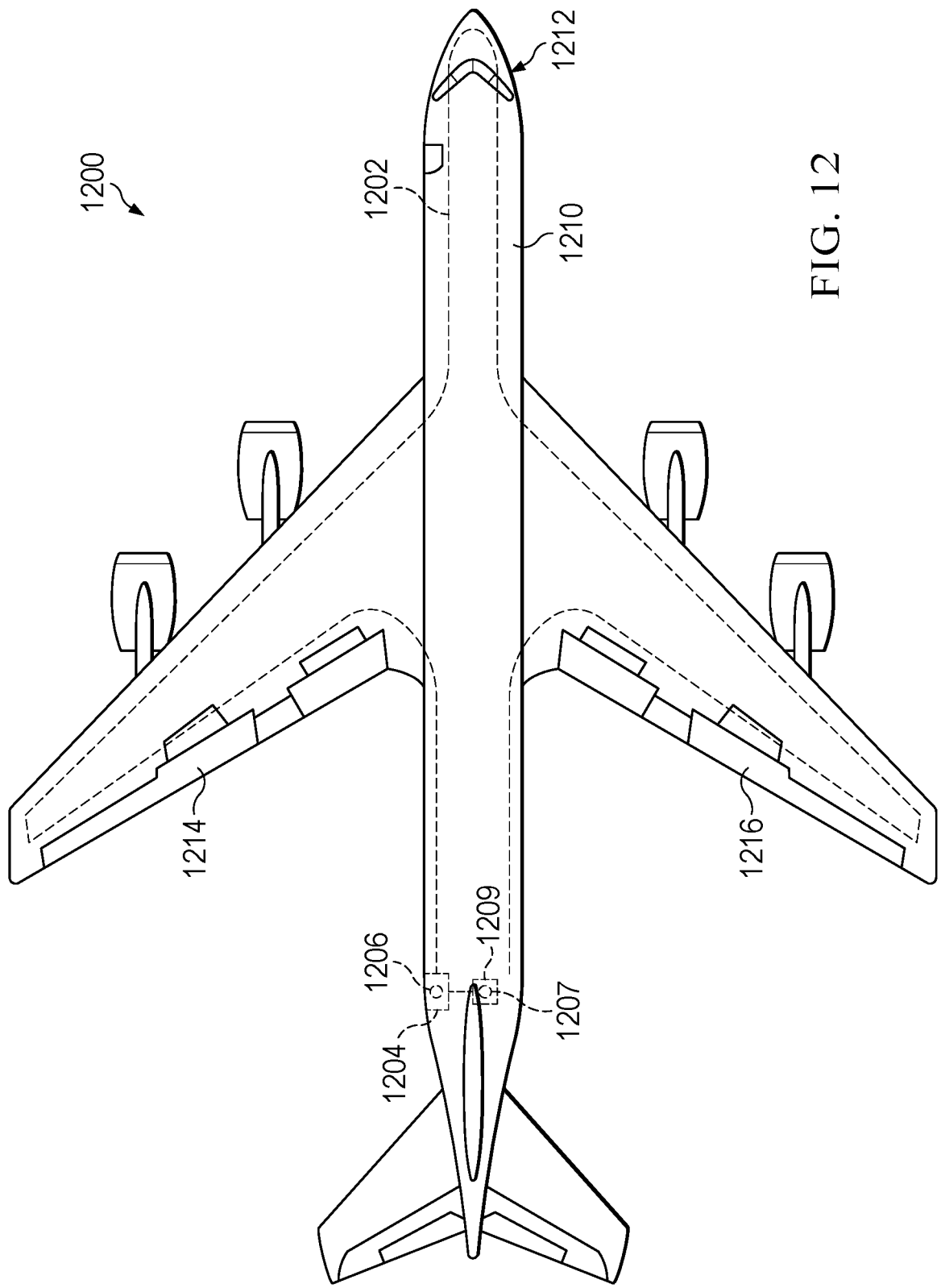
FIG. 12 is an illustration of an optical sensor system in an aircraft in accordance with an illustrative embodiment.

With reference now to FIG. 12, an illustration of an optical sensor system in an aircraft is depicted in accordance with an illustrative embodiment. In this illustrative example, aircraft 1200 is an example of an implementation for vehicle 204 in FIG. 2. In this depicted example, optical fiber cable 1202, optical source 1204, photodetector 1206, and signal analyzer 1207 in computer 1209 are located in aircraft 1200. Optical fiber cable 1202 and an optical source 1204 are used in both a signal transmission system and an optical sensor system in aircraft 1200. In this example, photodetector 1206 is an additional component used to form the optical sensor system in aircraft 1200.

As depicted, optical fiber cable 1202 extends through the interior of aircraft 1200. In this example, optical fiber cable 1202 extends through fuselage 1210, nose 1212, left wing 1214, and right wing 1216.

In this example, photodetector 1206 is an example of a backscatter sensor. Photodetector 1206 can detect backscatter generated in response to a set of optical pulses transmitted by optical source 1204. In response to detecting the backscatter, photodetector 1206 generates backscatter data. This backscatter data can be analyzed by signal analyzer 1207 in computer 1209 to determine parameters regarding aircraft 1200 using the backscatter data.

During operation, optical source 1204 can send pulses of light, such as laser light, into optical fiber cable 1202. These pulses of light can continuously scatter as the pulses of light travel through optical fiber cable 1202.

The backscatter can be measured by photodetector 1206. These measurements can include, for example, amplitude and frequency. The amplitude and frequency can be used to determine a parameter, such as temperature, along optical fiber cable 1202. In one illustrative example, a resolution of 1° C. in one meter segments can be determined over a 10 km length of optical fiber cable. Other parameters that can be measured include vibration, strain, pressure, chemical concentrations, or other properties can be measured depending on the type of optical fiber cable used.

Figure 13:
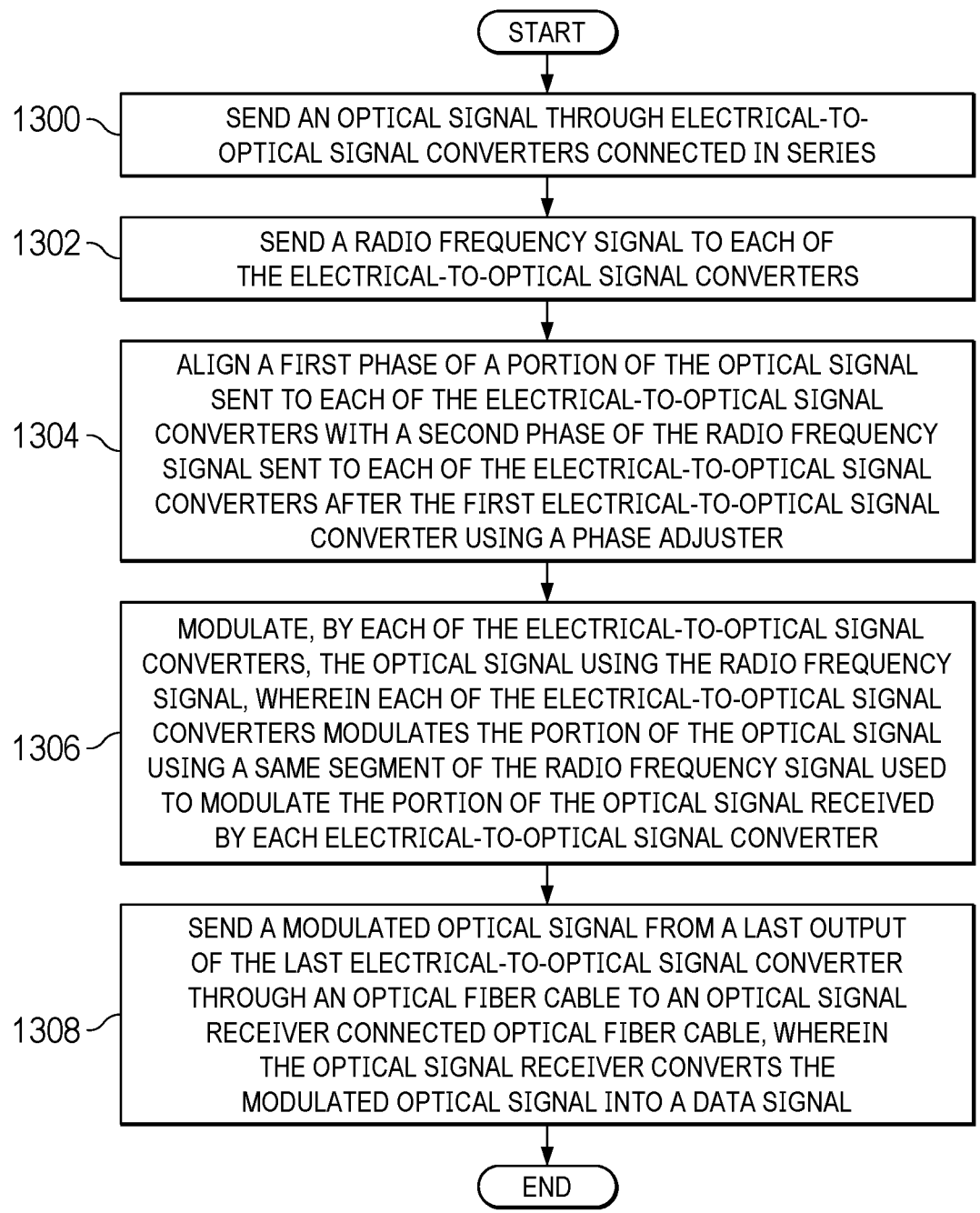
FIG. 13 is an illustration of a flowchart of a process for vehicle communications in accordance with an illustrative embodiment.

Turning next to FIG. 13, an illustration of a flowchart of a process for vehicle communications is depicted in accordance with an illustrative embodiment. The process in FIG. 13 can be implemented in hardware, software, or both. When implemented in software, the process can take the form of program instructions that are run by one of more processor units located in one or more hardware devices in one or more computer systems. For example, the process can be implemented in signal transmission system 202 in FIG. 2.

The process sends an optical signal through electrical-to-optical signal converters connected in series (step 1300). In step 1300, electrical-to-optical signal converters connected in series have a first length that is less than or equal to a second length of the radio frequency signal. The process sends a radio frequency signal to each of the electrical-to-optical signal converters (step 1302).

The process aligns a first phase of a portion of the optical signal sent to each of the electrical-to-optical signal converters with a second phase of the radio frequency signal sent to each of the electrical-to-optical signal converters after the first electrical-to-optical signal converter using a phase adjuster (step 1304). In step 1304, the phase adjuster can comprise at least one of a first length of a connecting cable connecting the antenna to an electrical-to-optical signal converter, a second length of a connecting optical fiber cable connecting the optical signal converter to a prior electrical-to-optical signal converter, or some other device or apparatus that can adjust the timing of phase of the radio frequency signal. In this illustrative example, the phase adjuster can introduce one of an advance or a delay in the second phase of the radio frequency signal. In another example, the phase adjuster can introduce one of an advance or a delay in first phase of the optical signal.

The process modulates, by each of the electrical-to-optical signal converters, the optical signal using the radio frequency signal, wherein each of the electrical-to-optical signal converters modulates the portion of the optical signal using a same segment of the radio frequency signal used to modulate the portion of the optical signal received by each electrical-to-optical signal converter (step 1306).

The process sends a modulated optical signal from a last output of the last electrical-to-optical signal converter through an optical fiber cable to an optical signal receiver connected optical fiber cable, wherein the optical signal receiver converts the modulated optical signal into a data signal (step 1308). The process terminates thereafter.

Figure 14:
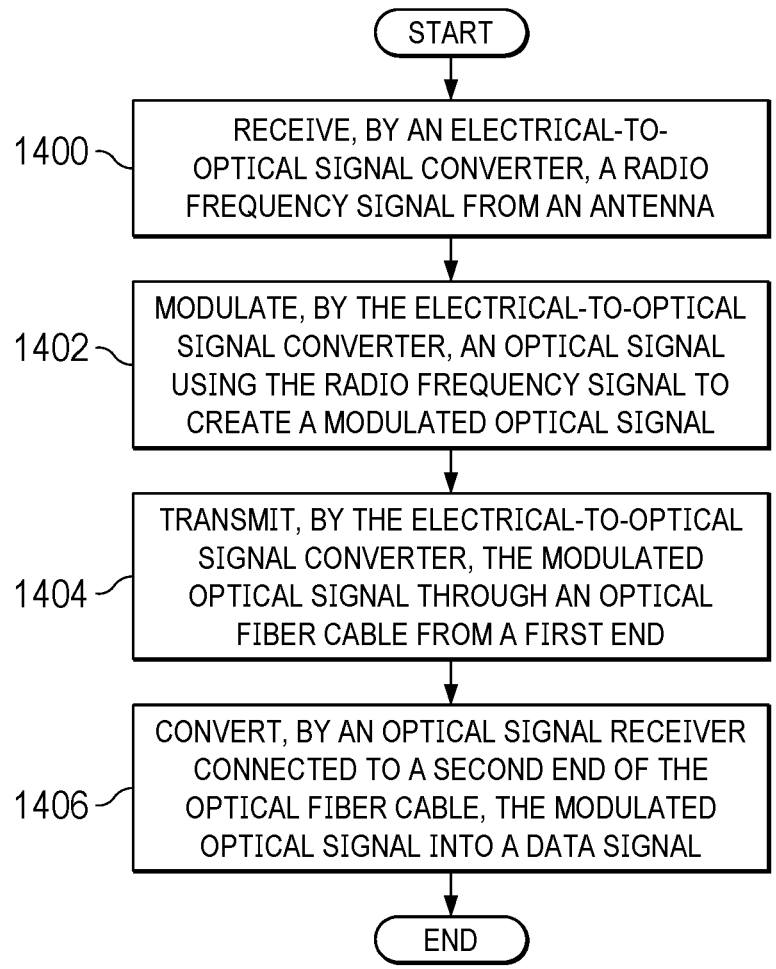
FIG. 14 is an illustration of a flowchart of a process for vehicle communications in accordance with an illustrative embodiment.

Turning next to FIG. 14, an illustration of a flowchart of a process for vehicle communications is depicted in accordance with an illustrative embodiment. The process in FIG. 14 can be implemented in hardware, software, or both. When implemented in software, the process can take the form of program instructions that are run by one of more processor units located in one or more hardware devices in one or more computer systems. For example, the process can be implemented in signal transmission system 202 in FIG. 2.

The process begins by receiving, by an electrical-to-optical signal converter, a radio frequency signal from an antenna (step 1400). The process modulates, by the electrical-to-optical signal converter, an optical signal using the radio frequency signal to create a modulated optical signal (step 1402).

The process transmits, by the electrical-to-optical signal converter, the modulated optical signal through an optical fiber cable from a first end (step 1404). The process converts, by an optical signal receiver connected to a second end of the optical fiber cable, the modulated optical signal into a data signal (step 1406). The process terminates thereafter.

Figure 15:
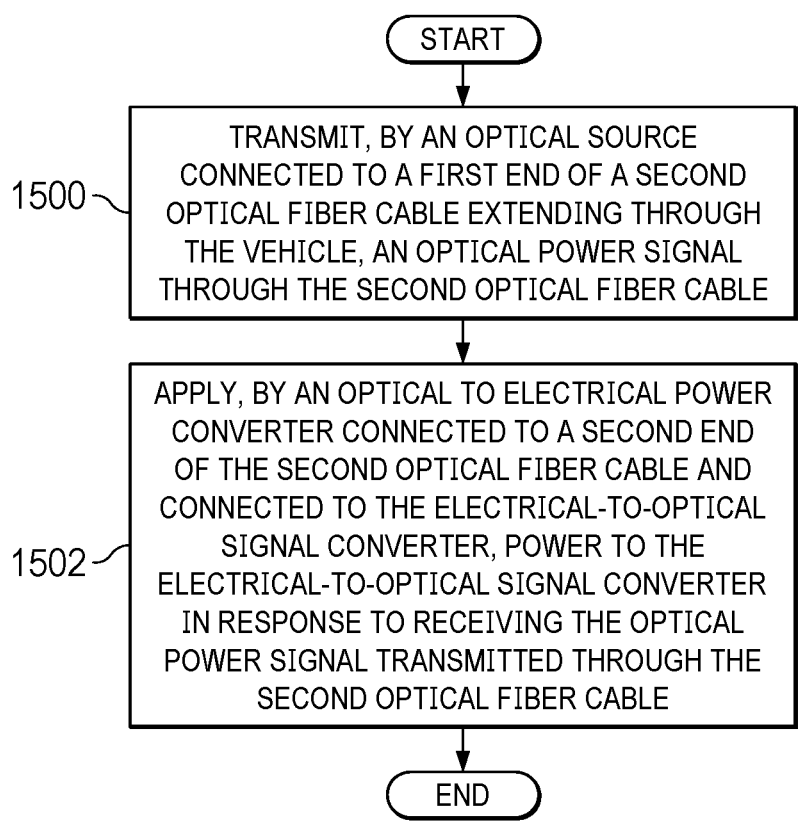
FIG. 15 is an illustration of a flowchart of a process for supplying power in accordance with an illustrative embodiment.

With reference next to FIG. 15, an illustration of a flowchart of a process for supplying power is depicted in accordance with an illustrative embodiment. The steps in this figure are examples of additional steps that can be performed with the steps in FIG. 14.

The process transmits, by an optical source connected to a first end of a second optical fiber cable extending through the vehicle, an optical power signal through the second optical fiber cable (step 1500). The process applies, by an optical to electrical power converter connected to a second end of the second optical fiber cable and connected to the electrical-to-optical signal converter, power to the electrical-to-optical signal converter in response to receiving the optical power signal transmitted through the second optical fiber cable (step 1502). The process terminates thereafter.

Figure 16:
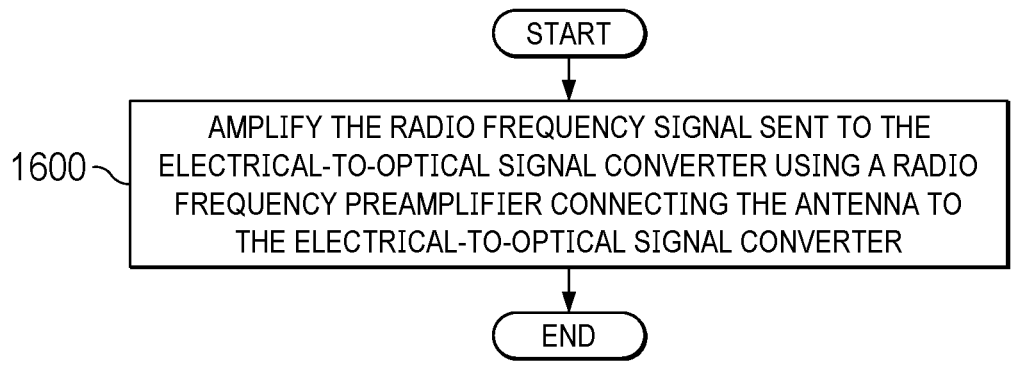
FIG. 16 is an illustration of a flowchart of a process for signal amplification in accordance with an illustrative embodiment.

In FIG. 16, an illustration of a flowchart of a process for signal amplification is depicted in accordance with an illustrative embodiment. The process in this figure is an example of an additional step that can be performed with the steps in FIG. 14.

The process amplifies the radio frequency signal sent to the electrical-to-optical signal converter using a radio frequency preamplifier connecting the antenna to the electrical-to-optical signal converter (step 1600). The process terminates thereafter. In this example, this preamplifier can be a low noise amplifier.

Figure 17:
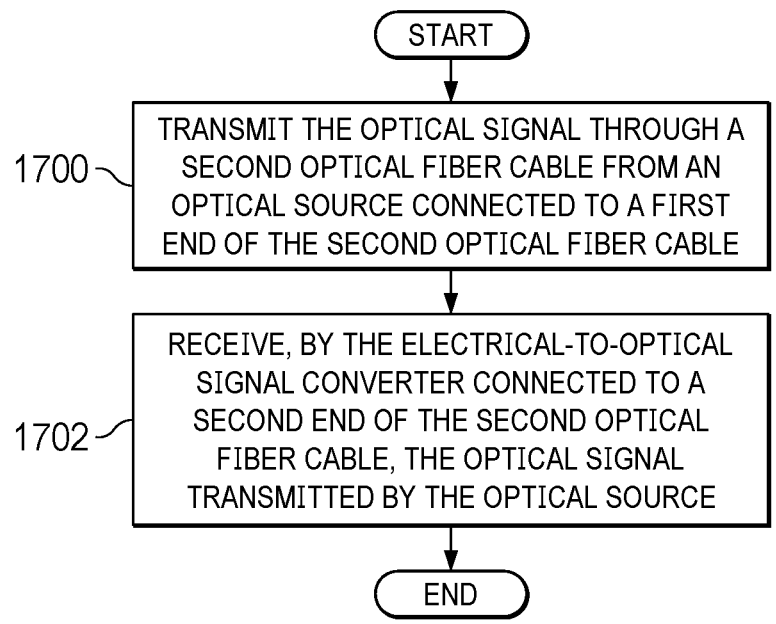
FIG. 17 is an illustration of a flowchart of a process for vehicle communications in accordance with an illustrative embodiment.

With reference now to FIG. 17, an illustration of a flowchart of a process for vehicle communications is depicted in accordance with an illustrative embodiment. The steps in this process are examples of additional steps that can be performed with the steps in FIG. 14.

The process begins by transmitting the optical signal through a second optical fiber cable from an optical source connected to a first end of the second optical fiber cable (step 1700). The process receives, by the electrical-to-optical signal converter connected to a second end of the second optical fiber cable, the optical signal transmitted by the optical source (step 1702). The process terminates thereafter.

Figure 18:
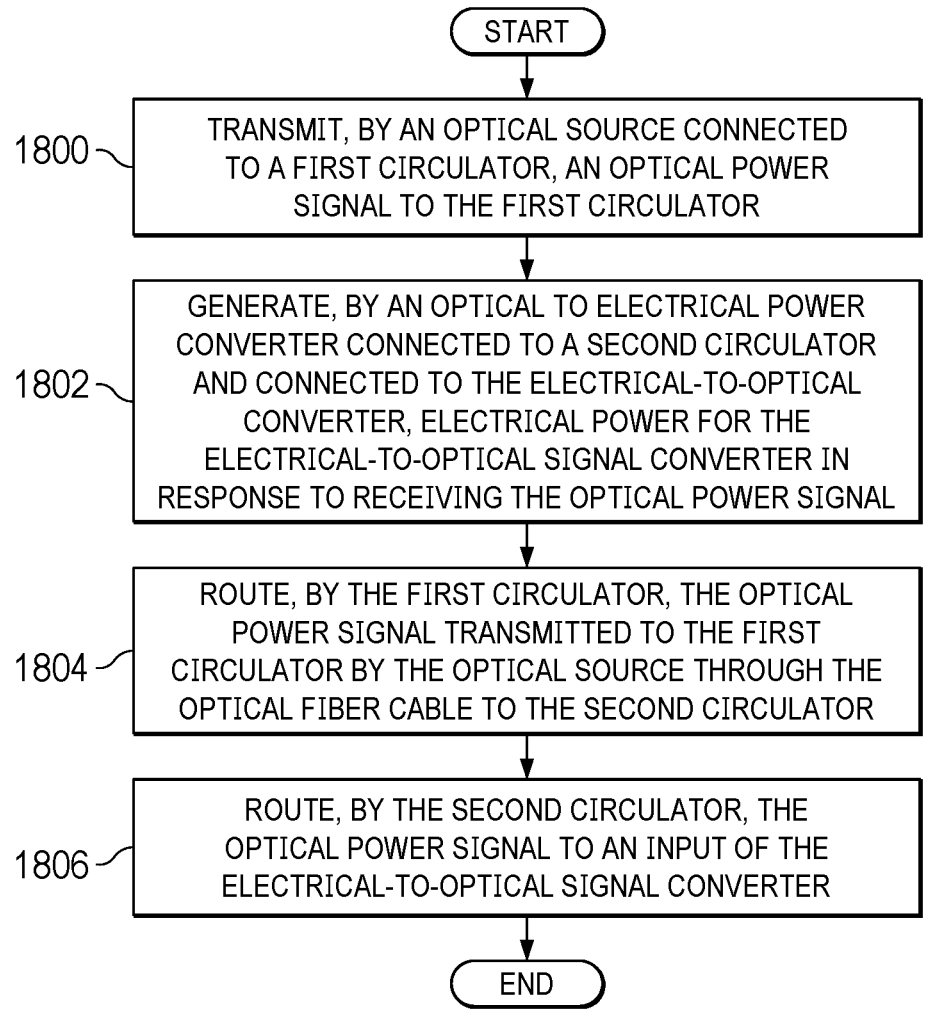
FIG. 18 is an illustration of a flowchart of a process for vehicle communications using circulators in accordance with an illustrative embodiment.

Turning next to FIG. 18, an illustration of a flowchart of a process for vehicle communications using circulators is depicted in accordance with an illustrative embodiment. The process illustrated in this figure is an example of additional steps that can be performed with the steps in FIG. 14.

The process begins by transmitting, by an optical source connected to a first circulator, an optical power signal to the first circulator (step 1800). The process generates, by an optical to electrical power converter connected to a second circulator and connected to the electrical-to-optical converter, electrical power for the electrical-to-optical signal converter in response to receiving the optical power signal (step 1802).

The process routes, by the first circulator, the optical power signal transmitted to the first circulator by the optical source through the optical fiber cable to the second circulator (step 1804). The process routes, by the second circulator, the optical power signal to an input of the electrical-to-optical signal converter (step 1806). The process terminates thereafter.

Figure 19:
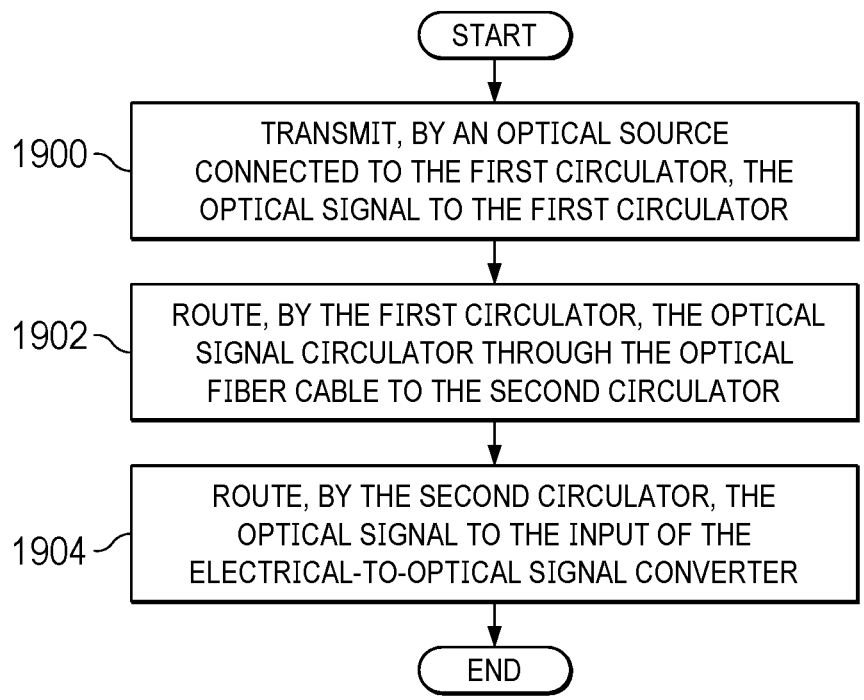
FIG. 19 is an illustration of a flowchart of a process for vehicle communications using circulators in accordance with an illustrative embodiment.

Turning now to FIG. 19, an illustration of a flowchart of a process for vehicle communications using circulators is depicted in accordance with an illustrative embodiment. The process illustrated in this figure is an example of additional steps that can be performed with the steps in FIG. 14. In this example, a first circulator connects the second end of the optical fiber cable to the optical signal receiver and a second circulator connects the first end of the optical fiber cable to an output of the electrical-to-optical signal converter. The second circulator is also connected to an input of the electrical-to-optical signal converter.

The process begins by transmitting, by an optical source connected to the first circulator, the optical signal to the first circulator (step 1900). The process routes, by the first circulator, the optical signal circulator through the optical fiber cable to the second circulator (step 1902). The process routes, by the second circulator, the optical signal to the input of the electrical-to-optical signal converter (step 1904). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
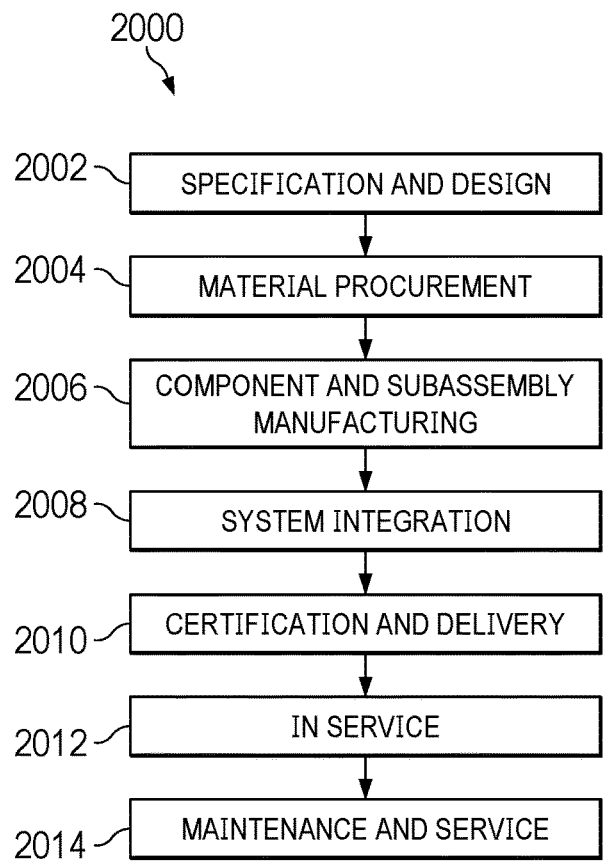
FIG. 20 is an illustration of an aircraft manufacturing and service method in accordance with an illustrative embodiment.
Figure 21:
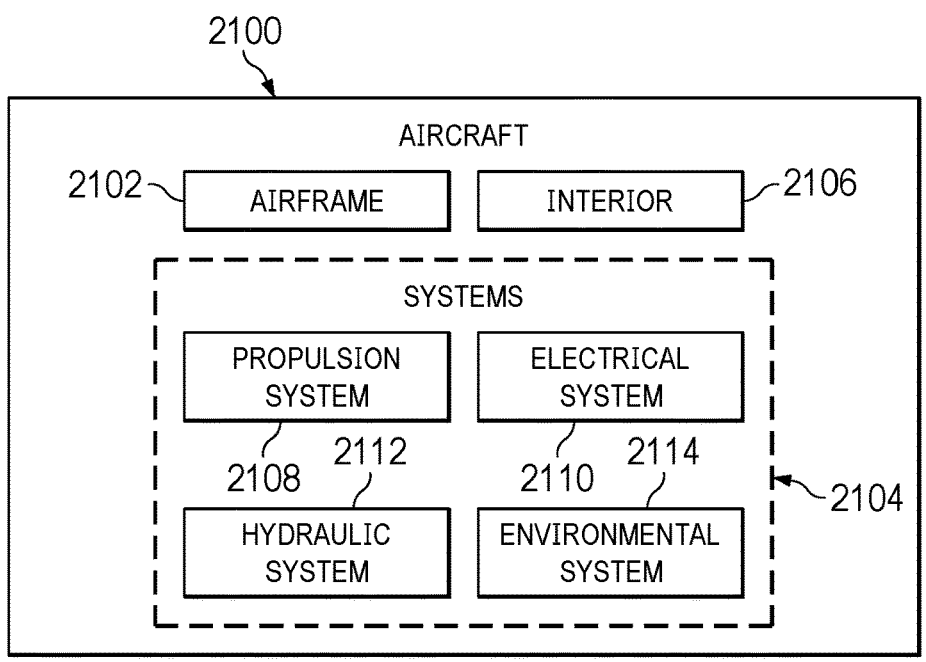
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

The systems in the illustrative examples can be implemented during system integration 2008. Further, the systems can also be added to aircraft during maintenance and service 2014 including during modification, reconfiguration, refurbishment, and other maintenance or service. The systems can be used by an aircraft during in service 2012. For example, the systems can be used to transmit radio frequency signals encoded in optical signals through the aircraft during operation of aircraft. Further, in one example, the sensor system systems can be used to detect parameters for the aircraft.

Some features of the illustrative examples are described in the following clauses. These clauses are examples of features and are not intended to limit other illustrative examples.

Clause 1

A signal transmission system comprising:
a first optical fiber cable extending through a vehicle;
a second optical fiber cable extending through the vehicle;
an optical source connected to a first end of the second optical fiber cable, wherein the optical source, when operating, transmits an optical signal through the second optical fiber cable, electrical-to-optical signal converters connected in series in which a first electrical-to-optical signal converter in the electrical-to-optical signal converters has an input connected to a second end of the second optical fiber cable and a last electrical-to-optical signal converter in the electrical-to-optical signal converters has an output connected to a first end of the first optical fiber cable and each electrical-to-optical signal converter in the electrical-to-optical signal converters has a signal input connected to an antenna,
wherein each of the electrical-to-optical signal converters, when operating,
receives a radio frequency signal at the signal input from the antenna;
receives the optical signal;
modulates the optical signal using the radio frequency signal; and
outputs the optical signal with modulation;
a phase adjuster, when operating, that aligns a first phase of a portion of the optical signal received by each electrical-to-optical signal converter with a second phase of the radio frequency signal received by each electrical-to-optical signal converter after a first electrical-to-optical signal converter such that each of the electrical-to-optical signal converters modulates the portion of the optical signal using a same segment of the radio frequency signal used to modulate the portion of the optical signal received by each electrical-to-optical signal converter; and an optical signal receiver connected to a second end of the first optical fiber cable, wherein the optical signal receiver, when operating, converts the modulated optical signal into a data signal.

Clause 2

The signal transmission system according to clause 1, wherein the electrical-to-optical signal converters connected in series have a first length that is less than or equal to a second length of the radio frequency signal.

Clause 3

The signal transmission system according to one of clauses 1 or 2, wherein the phase adjuster comprises at least one of a first length of a connecting coaxial cable connecting the antenna to an electrical-to-optical signal converter or a second length of a connecting optical fiber cable connecting the optical signal converter to a prior electrical-to-optical signal converter.

Clause 4

The signal transmission system according to one of clauses 1, 2, or 3, wherein in aligning the first phase, the phase adjuster introduces a delay the second phase of the radio frequency signal.

Clause 5

The signal transmission system according to one of clauses 1, 2, 3, or 4, wherein in aligning the first phase, the phase adjuster introduces an advance first phase of the optical signal.

Clause 6

The signal transmission system according to one of clauses 1, 2, 3, 4, or 5, wherein the vehicle is selected from a group comprising an aircraft, a surface ship, a submarine, a spacecraft, a train, and a ground vehicle.

Clause 7

A method for vehicle communications, method comprising:

sending an optical signal through electrical-to-optical signal converters connected in series;

sending a radio frequency signal to each of the electrical-to-optical signal converters;

aligning a first phase of a portion of the optical signal sent to each of the electrical-to-optical signal converters with a second phase of the radio frequency signal sent to each of the electrical-to-optical signal converters after the first electrical-to-optical signal converter using a phase adjuster;

modulating, by each of the electrical-to-optical signal converters, the optical signal using the radio frequency signal, wherein each of the electrical-to-optical signal converters modulates the portion of the optical signal using a same segment of the radio frequency signal used to modulate the portion of the optical signal received by each electrical-to-optical signal converter; and sending the modulated optical signal from a last output of the last electrical-to-optical signal converter through an optical fiber cable to an optical signal receiver connected to the optical fiber cable, wherein the optical signal receiver converts the modulated optical signal into a data signal.

Clause 8

The method according to clause 7, wherein the electrical-to-optical signal converters connected in series have a first length that is less than or equal to a second length of the radio frequency signal.

Clause 9

The method according to one of clauses 7 or 8, wherein the phase adjuster comprises at least one of a first length of a connecting cable connecting an antenna to an electrical-to-optical signal converter or a second length of a connecting optical fiber cable connecting the optical signal converter to a prior electrical-to-optical signal converter.

Clause 10

The method according to one of clauses 7, 8, or 9, wherein, the phase adjuster introduces one of an advance or a delay in the second phase of the radio frequency signal.

Clause 11

The method according to one of clauses 7, 8, 9, or 10, wherein the phase adjuster introduces one of an advance or a delay in the first phase of the optical signal.

Clause 12

The method according to one of clauses 7, 8, 9, 10, or 11, wherein the vehicle is selected from a group comprising an aircraft, a commercial airplane, a surface ship, a submarine, a spacecraft, a train, and a ground vehicle.

Clause 13

A signal transmission system comprising:

an optical fiber cable extending through a vehicle;

an electrical-to-optical signal converter connected to a first end of the optical fiber cable and connected an antenna, wherein the optical signal converter, when operating, receives a radio frequency signal from the antenna;

modulates an optical signal using the radio frequency signal to create a modulated optical signal; and transmits the modulated optical signal through the optical fiber cable from the first end; and an optical signal receiver connected to a second end of the optical fiber cable, wherein the optical signal receiver, when operating, converts the modulated optical signal into a data signal.

Clause 14

The signal transmission system according to clause 13, wherein the optical fiber cable is a first optical fiber cable and further comprising:

a second optical fiber cable extending through the vehicle;

an optical source connected to a first end of the second optical fiber cable, wherein the optical source, when operating, transmits an optical power signal through the second optical fiber cable; and an optical to electrical power converter connected to a second end of the second optical fiber cable and connected to the electrical-to-optical signal converter, wherein the optical to electrical power converter, when operating generates electrical power for the electrical-to-optical signal converter in response to receiving the optical power signal transmitted through the second optical fiber cable.

Clause 15

The signal transmission system according to one of clauses 13 or 14 further comprising:

a radio frequency preamplifier connecting the antenna to the electrical-to-optical signal converter, wherein the radio frequency preamplifier, when operating, amplifies the radio frequency signal sent to the electrical-to-optical signal converter.

Clause 16

The signal transmission system according to one of clauses 13, 14, or 15, further comprising:
- a second optical fiber cable;
- an optical source connected to a first end of the second optical fiber cable, wherein the optical source, when operating, transmits the optical signal through the second optical fiber cable,
- wherein the electrical-to-optical signal converter is further connected to a second end of the second optical fiber cable and wherein the electrical-to-optical signal converter, when operating, receives the optical signal transmitted by the optical source.

Clause 17

The signal transmission system according to clause 16 further comprising:
- a bias circuit that sets a bias point for the electrical-to-optical converter maintains the electrical-to-optical converter in a linear operating range such that a desired level of sensitivity to changes in the radio frequency signal occurs.

Clause 18

The signal transmission system according to one of clauses 13, 14, 15, 16, or 17 further comprising:
- a first circulator connects the second end of the optical fiber cable to the optical signal receiver;
- a second circulator connects the first end of the optical fiber cable to an output the electrical-to-optical signal converter;
- an optical source connected to the first circulator, wherein the optical source, when operating, transmits an optical power signal to the first circulator; and
- an optical to electrical power converter connected to the second circulator and connected to the electrical-to-optical converter, wherein optical to electrical power converter, when operating, generates electrical power for the electrical-to-optical signal converter in response to receiving the optical power signal,
- wherein the optical power signal transmitted to the first circulator by the optical source is routed by the first circulator through the optical fiber cable to the second circulator and wherein the second circulator routes the optical power signal to an input of the electrical-to-optical signal converter.

Clause 19

The signal transmission system according to one of clauses 13, 14, 15, 16, 17, or 18 further comprising:
- a first circulator that connects the second end of the optical fiber cable to the optical signal receiver;
- a second circulator connects the first end of the optical fiber cable to an output of the electrical-to-optical signal converter and is connected to an input of the electrical-to-optical signal converter; and
- an optical source connected to the first circulator, wherein the optical source, when operating, transmits the optical signal to the first circulator, wherein the optical signal is routed by the first circulator through the optical fiber cable to the second circulator and wherein the second circulator routes the optical signal to the input of the electrical-to-optical signal converter.

Clause 20

The signal transmission system according to one of clauses 13, 14, 15, 16, 17, 18, or 19 further comprising:
- a bias circuit that sets a bias point for the electrical-to-optical converter maintains the electrical-to-optical converter in a linear operating range such that a desired level of sensitivity to changes in the radio frequency signal occurs.

Clause 21

The signal transmission system according to one of clauses 13, 14, 15, 16, 17, 18, 19, or 20, wherein the vehicle is an aircraft and the antenna connected to a vertical stabilizer at a tail of the aircraft and the optical signal receiver is located in electronics and equipment bay in a nose of the aircraft.

Clause 22

The signal transmission system according to one of clauses 13, 14, 15, 16, 17, 18, 19, 20, or 21 wherein the vehicle is selected from a group comprising an aircraft, a surface ship, a submarine, a spacecraft, a train, and a ground vehicle.

Clause 23

A method for vehicle communications, the method comprising:
- receiving, by an electrical-to-optical signal converter, a radio frequency signal from an antenna connected to a vehicle;
- modulating, by the electrical-to-optical signal converter, an optical signal using the radio frequency signal to create a modulated optical signal;
- transmitting, by the electrical-to-optical signal converter, the modulated optical signal through an optical fiber cable from a first end; and
- converting, by an optical signal receiver connected to a second end of the optical fiber cable, the modulated optical signal into a data signal.

Clause 24

The method according to clause 23, wherein the optical fiber cable is a first optical fiber cable and further comprising:
- transmitting, by an optical source connected to a first end of a second optical fiber cable extending through the vehicle, an optical power signal through the second optical fiber cable; and
- supplying, by an optical to electrical power converter connected to a second end of the second optical fiber cable and connected to the electrical-to-optical signal converter power to the electrical-to-optical signal converter in response to receiving the optical power signal transmitted through the second optical fiber cable.

Clause 25

The method according to one of clauses 23 or 24 further comprising:
- amplifying the radio frequency signal sent to the electrical-to-optical signal converter using a radio frequency preamplifier connecting the antenna to the electrical-to-optical signal converter.

Clause 26

The method according to one of clauses 23, 24, or 25, further comprising:
- transmitting the optical signal through a second optical fiber cable from an optical source connected to a first end of the second optical fiber cable; and
- receiving, by the electrical-to-optical signal converter connected to a second end of the second optical fiber cable, the optical signal transmitted by the optical source.

Clause 27

The method according to one of clauses 23, 24, 25, or 26 further comprising:
- transmitting, by an optical source connected to a first circulator, an optical power signal to the first circulator, generating, by an optical to electrical power converter connected to a second circulator and connected to the electrical-to-optical converter, electrical power for the electrical-to-optical signal converter in response to receiving the optical power signal;

routing, by the first circulator, the optical power signal transmitted to the first circulator by the optical source through the optical fiber cable to the second circulator; and routing, by the second circulator, the optical power signal to an input of the electrical-to-optical signal converter.

Clause 28

The method according to one of clauses 23, 24, 25, 26, or 27, wherein a first circulator that connects the second end of the optical fiber cable to the optical signal receiver and a second circulator connects the first end of the optical fiber cable to an output of the electrical-to-optical signal converter and is connected to an input of the electrical-to-optical signal converter and further comprising:

transmitting, by an optical source connected to the first circulator, the optical signal to the first circulator;

routing, by the first circulator, the optical signal circulator through the optical fiber cable to the second circulator; and routing, by the second circulator, the optical signal to the input of the electrical-to-optical signal converter.

Clause 29

The method according to one of clauses 23, 24, 25, 26, 27, or 28, wherein the vehicle is an aircraft and the antenna connected to a vertical stabilizer at a tail of the aircraft and the optical signal receiver is located in electronics and equipment bay in a nose of the aircraft.

Clause 30

The method according to one of clauses 23, 24, 25, 26, 27, 28, or 29 wherein the vehicle is selected from a group comprising an aircraft, a surface ship, a submarine, a spacecraft, a train, and a ground vehicle.

Clause 31

An optical sensor system comprising:

an optical fiber cable extending through a vehicle;

an electrical-to-optical signal converter connected to a first end of the optical fiber cable and connected an antenna for the vehicle, wherein the optical signal converter, when operating, receives a radio frequency signal from the antenna;

modulates an optical signal using the radio frequency signal to create a modulated optical signal; and transmits the modulated optical signal through the optical fiber cable from the first end; and an optical signal receiver connected to a second end of the optical fiber cable, wherein the optical signal receiver, when operating, converts the modulated optical signal into a data signal;

an optical source connected to the second end of the optical fiber cable, wherein the optical source, when operating, is controllable to transmit a set of optical fiber pulses through the optical fiber cable;

a backscatter sensor connected to the second end of the optical fiber cable, wherein the backscatter sensor, when operating, detects backscatter generated in response to the set of optical pulses; and generates backscatter data in response to detecting the backscatter; and a signal analyzer in communication with the backscatter sensor, wherein the signal analyzer, when operating, determines parameters regarding the vehicle using the backscatter data.

Clause 32

The optical sensor system according to clause 31, the vehicle is an aircraft and wherein the optical fiber cable extends through a fuselage of the aircraft.

Clause 33

The optical sensor system according to one of clauses 31 or 32, wherein the vehicle is an aircraft and the optical fiber cable extends through at least one of a wing or stabilizer of the aircraft.

Clause 34

The optical sensor system according to one of clauses 31, 32, or 33 wherein the vehicle is selected from a group comprising an aircraft, a surface ship, a submarine, a spacecraft, a train, and a ground vehicle.

Clause 35

A signal modulation system comprising:

electrical-to-optical signal converters; and a set of phase adjusters positioned in series in between signal inputs to the electrical-to-optical signal converters such that a first phase of an input signal is repeatedly matched with a second phase of an optical at each electrical-to-optical signal converter in the electrical-to-optical signal converters, wherein a half wave voltage of the electrical-to-optical signal converters is reduced.

Clause 36

The signal modulation system according to clause 35, wherein a phase adjuster in the set of phase adjusters, when operating, changes a timing of the input signal by one of delaying the input signal or advancing the input signal.

Clause 37

The signal modulation system according to one of clauses 35 or 36, set of phase adjusters comprises at least one of a radio frequency time delay device, a radio frequency time advance device, an optical time delay device, or an optical time advance device.

Clause 38

The signal modulation system according to one of clauses 35, 36, or 37, wherein the signal is a radio frequency signal.

Clause 39

The signal modulation system according to one of clauses 35, 36, 37, or 38, wherein the electrical-to-optical signal converters are selected from at least one of a bulk electro-optic modulator, or a traveling wave electro-optic modulator.

Clause 40

The signal modulation system according to one of clauses 35, 36, 37, 38, or 39, wherein a time delay device in the set of phase adjusters is comprised of a high refractive index material.

Clause 41

The signal modulation system according to clause 40, wherein the high refractive index material is a photonic crystal.

Clause 42

The signal modulation system according to clause 41, wherein the high refractive index material is a nanostructured material.

Clause 43

The signal modulation system according to clause 42, wherein the nanostructured material has a structure selected from one of an amorphous structure and a crystalline structure.

Clause 44

The signal modulation system according to one of clauses 35, 36, 37, 38, 39, 40, 41, 42, or 43, wherein a time advance device in the set of phase adjusters is comprised of a low refractive index material.

Clause 45

The signal modulation system according to clause 44, wherein the low refractive index material is selected from a group comprising an air gap, a photonic crystal and a holey fiber.

Thus, the illustrative examples provide a method, apparatus, and system for transmitting signals. In one illustrative example, a signal transmission system comprises an optical fiber, an electrical-to-optical signal converter, and an optical signal receiver. The optical fiber cable extending through a vehicle. The electrical-to-optical signal converter is connected to a first end of the optical fiber cable and is connected an antenna. The optical signal converter, when operating, receives a radio frequency signal from the antenna; modulates an optical signal using the radio frequency signal to create a modulated optical signal; and transmits the modulated optical signal through the optical fiber cable from the first end. The optical signal receiver is connected to a second end of the optical fiber cable, wherein the optical signal receiver, when operating, converts the modulated optical signal into a data signal.

The use of this signal transmission system employing an optical fiber cable reduces the weight of the vehicle. This reduction in weight can increase fuel efficiency and vehicles such as aircraft. Further, additional weight reductions can occur by design changes such as a smaller antenna. The smaller antenna can also have higher aerodynamic performance.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A signal transmission system comprising:
a first optical fiber cable extending through a vehicle;
an electrical-to-optical signal converter connected to a first end of the first optical fiber cable and connected to an antenna, wherein the electrical-to-optical signal converter, when operating:
receives a radio frequency signal from the antenna;
modulates an optical signal using the radio frequency signal to create a modulated optical signal;
transmits the modulated optical signal through the first optical fiber cable from the first end;
an optical signal receiver connected to a second end of the first optical fiber cable, wherein the optical signal receiver, when operating, converts the modulated optical signal into a data signal;
a second optical fiber cable extending through the vehicle;
an optical source connected to a first end of the second optical fiber cable, wherein the optical source, when operating, transmits an optical power signal through the second optical fiber cable; and
an optical to electrical power converter connected to a second end of the second optical fiber cable and connected to the electrical-to-optical signal converter, wherein the optical to electrical power converter, when operating, generates electrical power for the electrical-to-optical signal converter in response to receiving the optical power signal transmitted through the second optical fiber cable.

2. The signal transmission system of claim 1, further comprising:
a radio frequency preamplifier connecting the antenna to the electrical-to-optical signal converter, wherein the radio frequency preamplifier, when operating, amplifies the radio frequency signal sent to the electrical-to-optical signal converter.

3. The signal transmission system of claim 1 further comprising:
a bias circuit configured to set a bias point for the electrical-to-optical signal converter to maintain the electrical-to-optical signal converter in a linear operating range such that a desired level of sensitivity to changes in the radio frequency signal occurs.

4. The signal transmission system of claim 1, further comprising:
a first circulator connecting the second end of the first optical fiber cable to the optical signal receiver;
a second circulator connecting the first end of the first optical fiber cable to an output of the electrical-to-optical signal converter;
the optical source connected to the first circulator, wherein the optical source, when operating, transmits an optical power signal to the first circulator; and
an optical to electrical power converter connected to the second circulator and connected to the electrical-to-optical signal converter, wherein the optical to electrical power converter, when operating, generates electrical power for the electrical-to-optical signal converter in response to receiving the optical power signal;
wherein, when the first circulator is operating, the optical power signal transmitted to the first circulator by the optical source is routed by the first circulator through the first optical fiber cable to the second circulator, and wherein the second circulator, when operating, routes the optical power signal to an input of the electrical-to-optical signal converter.

5. The signal transmission system of claim 1, further comprising:
a first circulator connecting the second end of the first optical fiber cable to the optical signal receiver;
a second circulator connecting the first end of the first optical fiber cable to an output of the electrical-to-optical signal converter, and wherein the second circulator is further connected to an input of the electrical-to-optical signal converter; and the optical source connected to the first circulator, wherein the optical source, when operating, transmits the optical signal to the first circulator, wherein the optical signal is routed by the first circulator through the first optical fiber cable to the second circulator, and wherein the second circulator routes the optical signal to the input of the electrical-to-optical signal converter.

6. The signal transmission system of claim 1, wherein the vehicle is an aircraft and the antenna connected to a vertical stabilizer at a tail of the aircraft and the optical signal receiver is located in electronics and equipment bay in a nose of the aircraft.

7. The signal transmission system of claim 1, wherein the vehicle is selected from a group comprising an aircraft, a surface ship, a submarine, a spacecraft, a train, and a ground vehicle.

8. A method for vehicle communications, the method comprising:
receiving, by an electrical-to-optical signal converter, a radio frequency signal from an antenna connected to a vehicle;
modulating, by the electrical-to-optical signal converter, an optical signal using the radio frequency signal to create a modulated optical signal;
transmitting, by the electrical-to-optical signal converter, the modulated optical signal through a first optical fiber cable from a first end; and
converting, by an optical signal receiver connected to a second end of the first optical fiber cable, the modulated optical signal into a data signal;
transmitting, by an optical source connected to a first end of a second optical fiber cable extending through the vehicle, an optical power signal through the second optical fiber cable; and
supplying, by an optical to electrical power converter connected to a second end of the second optical fiber cable and connected to the electrical-to-optical signal converter, power to the electrical-to-optical signal converter in response to receiving the optical power signal transmitted through the second optical fiber cable.

9. The method of claim 8, further comprising:
amplifying the radio frequency signal sent to the electrical-to-optical signal converter using a radio frequency preamplifier connecting the antenna to the electrical-to-optical signal converter.

10. The method of claim 8, further comprising:
transmitting the optical signal through a second optical fiber cable from an optical source connected to a first end of the second optical fiber cable; and
receiving, by the electrical-to-optical signal converter connected to a second end of the second optical fiber cable, the optical signal transmitted by the optical source.

11. The method of claim 8, further comprising:
transmitting, by an optical source connected to a first circulator, an optical power signal to the first circulator;
generating, by an optical to electrical power converter connected to a second circulator and connected to the electrical-to-optical signal converter, electrical power for the electrical-to-optical signal converter in response to receiving the optical power signal;
routing, by the first circulator, the optical power signal transmitted to the first circulator by the optical source through the first optical fiber cable to the second circulator; and
routing, by the second circulator, the optical power signal to an input of the electrical-to-optical signal converter.

12. The method of claim 8, wherein a first circulator connects the second end of the first optical fiber cable to the optical signal receiver, wherein a second circulator connects the first end of the first optical fiber cable to an output of the electrical-to-optical signal converter, and wherein the second circulator is further connected to an input of the electrical-to-optical signal converter, and further comprising:
transmitting, by an optical source connected to the first circulator, the optical signal to the first circulator;
routing, by the first circulator, the optical signal circulator through the first optical fiber cable to the second circulator; and
routing, by the second circulator, the optical signal to the input of the electrical-to-optical signal converter.

13. The method of claim 8, wherein the vehicle is an aircraft, and wherein the antenna connected to a vertical stabilizer at a tail of the aircraft and the optical signal receiver is located in electronics and equipment bay in a nose of the aircraft.

14. The method of claim 8, wherein the vehicle is selected from a group comprising an aircraft, a surface ship, a submarine, a spacecraft, a train, and a ground vehicle.

15. An optical sensor system comprising:
a first optical fiber cable extending through a vehicle;
an electrical-to-optical signal converter connected to a first end of the first optical fiber cable and connected to an antenna for the vehicle, wherein the electrical-to-optical signal converter, when operating:
receives a radio frequency signal from the antenna;
modulates an optical signal using the radio frequency signal to create a modulated optical signal; and
transmits the modulated optical signal through the first optical fiber cable from the first end;
an optical signal receiver connected to a second end of the first optical fiber cable, wherein the optical signal receiver, when operating, converts the modulated optical signal into a data signal;
an optical source connected to the second end of the first optical fiber cable, wherein the optical source, when operating, is controllable to transmit a set of optical fiber pulses through the first optical fiber cable;
a backscatter sensor connected to the second end of the optical fiber cable, wherein the backscatter sensor, when operating:
detects backscatter generated in response to the set of optical pulses; and
generates backscatter data in response to detecting the backscatter; and
a signal analyzer in communication with the backscatter sensor, wherein the signal analyzer, when operating, determines parameters regarding the vehicle using the backscatter data,
a second optical fiber cable extending through the vehicle; and
an optical to electrical power converter connected to a second end of the second optical fiber cable and connected to the electrical-to-optical signal converter, wherein the optical to electrical power converter, when operating, generates electrical power for the electrical-to-optical signal converter in response to receiving the optical power signal transmitted through the second optical fiber cable.

16. The optical sensor system of claim 15, wherein the vehicle is an aircraft, and wherein the first optical fiber cable extends through a fuselage of the aircraft.

17. The optical sensor system of claim 15, wherein the vehicle is an aircraft, and wherein the first optical fiber cable extends through at least one of a wing or stabilizer of the aircraft.

18. The optical sensor system of claim 15, wherein the vehicle is selected from a group comprising an aircraft, a surface ship, a submarine, a spacecraft, a train, and a ground vehicle.

* * * * *